(12) United States Patent
Takizawa et al.

(10) Patent No.: US 10,620,770 B2
(45) Date of Patent: Apr. 14, 2020

(54) CONDUCTIVE FILM, TOUCH PANEL, AND DISPLAY DEVICE

(71) Applicant: VTS-Touchsensor Co., Ltd., Higashiomi, Shiga (JP)

(72) Inventors: Yumi Takizawa, Tokyo (JP); Tomohiro Nakagome, Tokyo (JP)

(73) Assignee: VTS-Touchsensor Co., Ltd., Higashiomi, Shiga (JP)

( * ) Notice: Subject to any disclaimer, the term of this patent is extended or adjusted under 35 U.S.C. 154(b) by 31 days.

(21) Appl. No.: 16/000,130

(22) Filed: Jun. 5, 2018

(65) Prior Publication Data

US 2019/0121471 A1    Apr. 25, 2019

(30) Foreign Application Priority Data

Jun. 5, 2017 (JP) ................... 2017-110784

(51) Int. Cl.
*G06F 3/047* (2006.01)
*G06F 3/041* (2006.01)
(Continued)

(52) U.S. Cl.
CPC .......... *G06F 3/047* (2013.01); *G02F 1/13338* (2013.01); *G06F 3/041* (2013.01);
(Continued)

(58) Field of Classification Search
CPC ...... G06F 3/047; G06F 3/0412; G06F 3/0416; G06F 3/044; G06F 2203/04112; G02F 1/13338
See application file for complete search history.

(56) References Cited

U.S. PATENT DOCUMENTS 9,280,185 B2 *  3/2016  Kuriki ................. G06F 3/044
9,312,048 B2 *  4/2016  Ichiki ................. G06F 3/044
(Continued)

FOREIGN PATENT DOCUMENTS

EP    3 163 418 A1    5/2017
JP    2013-156725 A   8/2013
JP    2016 212517 A   12/2016

*Primary Examiner* — Ricardo Osorio
(74) *Attorney, Agent, or Firm* — McGlew and Tuttle, P.C.

(57) ABSTRACT

[Problem] The problem addressed by the present invention lies in providing a conductive film, a touch panel and a display device which make it possible to suppress a reduction in the quality of an image observed on a display device.
[Solution] A drive lattice 31DL includes an enlargement region, and a sensing lattice 33SL includes a facing region lying over the enlargement region with a transparent dielectric layer therebetween. When one of the directions in which a plurality of sensing electrode wires 33SR are arranged in the facing region is a placement direction, and, in the placement direction, the interval at which drive electrode wires 31DR in the enlargement region are arranged is greater than the interval at which the sensing electrode wires 33SR in the facing region are arranged, and the enlargement region and the facing region are seen from a position in front of said regions, then one drive electrode wire 31DR is positioned between two sensing electrode wires 33SR which are adjacent to each other in the placement direction.

8 Claims, 12 Drawing Sheets

(51) Int. Cl.
*G02F 1/1333* (2006.01)
*G06F 3/044* (2006.01)

(52) U.S. Cl.
CPC ............ *G06F 3/044* (2013.01); *G06F 3/0412* (2013.01); *G06F 3/0416* (2013.01); *G06F 2203/04112* (2013.01)

(56) References Cited

U.S. PATENT DOCUMENTS

| | | | |
|---|---|---|---|
| 9,360,971 B2* | 6/2016 | Barton | G06F 3/0488 |
| 9,386,691 B2* | 7/2016 | Kuriki | G06F 3/041 |
| 9,459,751 B2* | 10/2016 | Weaver | G06F 3/041 |
| 9,785,297 B2* | 10/2017 | Kawaguchi | G06F 3/044 |
| 9,933,907 B2* | 4/2018 | Ono | G06F 3/044 |
| 10,386,946 B2* | 8/2019 | Maeng | G06F 3/041 |
| 10,401,995 B2* | 9/2019 | Maeng | G06F 3/041 |
| 2015/0342034 A1 | 11/2015 | Iwami | |
| 2016/0018929 A1* | 1/2016 | Kida | G06F 3/044 345/174 |

* cited by examiner

CONDUCTIVE FILM, TOUCH PANEL, AND DISPLAY DEVICE

TECHNICAL FIELD

The present invention relates to a conductive film comprising a plurality of electrode wires, a touch panel comprising said conductive film, and a display device comprising said touch panel.

BACKGROUND ART

A display device employing a touch panel as an input device comprises: a display panel for displaying an image, and the touch panel which is placed over the display panel. An electrostatic capacitive method, in which contact of a finger or the like with an operating surface of the touch panel is detected as a change in electrostatic capacity, is widely used as a method for detecting a contact position of a finger or the like on the touch panel. In a touch panel employing an electrostatic capacitive method, a conductive film of the touch panel comprises: a plurality of first electrodes extending along a first direction, a plurality of second electrodes extending along a second direction orthogonal to the first direction, and a transparent dielectric layer interposed between the first electrodes and the second electrodes. The contact position of a finger or the like on the operating surface is then detected on the basis of a change in electrostatic capacity between one first electrode and each of the plurality of second electrodes being detected for each first electrode.

According to an example of this kind of conductive film, the respective first electrodes and second electrodes are formed by a plurality of fine electrode wires comprising a metal such as silver or copper (e.g., see Patent Document 1). By using a metal as the material of the electrode wires, it is possible to achieve rapid responsiveness and high resolution when the contact position is detected, while it is also possible to reduce the size of the touch panel and to reduce production costs.

In a configuration in which the electrode wires are formed from a metal which absorbs or reflects visible light, a plurality of first electrodes and a plurality of second electrodes form an electrode wire pattern in which the electrode wires forming said electrodes are alternately intersecting, as seen from the operating surface of the touch panel. Meanwhile, a black matrix defining a plurality of pixels along a first direction and a second direction also forms a pixel pattern which is a lattice-shaped pattern in a display panel on which the touch panel is laminated.

Here, a periodic structure of the electrode wire pattern and a periodic structure of the pixel pattern lie one over the other as seen from the operating surface of the touch panel, and an offset in the two periodic structures sometimes induces moiré. When this moiré is observed, there is a reduction in the quality of an image observed on a display device. The shape and period of the electrode wire pattern is therefore set to a shape and period such that moiré is unlikely to be observed when the electrode wire pattern and the pixel pattern are placed one over the other.

PRIOR ART DOCUMENTS

Patent Documents

[Patent Document 1] JP 2013-156725 A

SUMMARY OF THE INVENTION

Problem to be Solved by the Invention

One example of an electrode wire pattern is a lattice-shaped pattern. For example, the plurality of first electrode wires forming the first electrodes form one lattice pattern and the plurality of second electrode wires forming the second electrodes also form the same lattice pattern. The lattice pattern which is formed as the electrode wire pattern then has a smaller period than each of the lattice pattern formed by the first electrode wires and the lattice pattern formed by the second electrode wires.

Here, a transparent dielectric layer is interposed between the first electrodes and the second electrodes, as mentioned above. For the observer, the first electrodes are positioned on the front side of the transparent dielectric layer and the second electrodes are positioned on the rear side of the transparent dielectric layer. The positions of the second electrode wires in relation to the first electrode wires may therefore sometimes appear offset to the observer in relation to an ideal position, which is a design position, due to the thickness of the transparent dielectric layer and refraction of light at the interface of the transparent dielectric layer. For example, the first electrode wires and the second electrode wires normally lie one over the other in such a way as to form a predetermined electrode wire pattern when the whole of the conductive film is seen from the front. However, as display devices have tended to become larger in recent years, the whole of the conductive film is not necessarily included in the region in front of the observer actually looking at the display device. The angle of the line of vision of the observer in relation to a region remote from in front of the observer within the conductive film, e.g. a region positioned at an edge portion of the field of vision of the observer, is inclined with respect to the surface of the conductive film. Since the thickness of the transparent dielectric layer and refraction of light have an effect, the positions of the second electrode wires in relation to the first electrode wires in the region at the edge portion of the field of vision therefore appear different to when this region is seen from the front.

Consequently, even if a design is adopted such that the first electrode wires and the second electrode wires form a uniform lattice over the whole of the electrode wire pattern and this lattice has a period and inclination such that moiré is unlikely to be observed, the lattice may sometimes appear distorted to an observer. As a result, it may be the case that a repeating structure having a period different from the design period is partially produced so that moiré is observed, and unevenness in the brightness may be experienced because the density of the electrode wire arrangement appears nonuniform. This phenomenon leads to a reduction in the quality of the image observed on the display device. Moiré is especially likely to be observed when the second electrode wires appear to be over the first electrode wires.

The aim of the present invention lies in providing a conductive film, a touch panel and a display device which make it possible to suppress a reduction in the quality of an image observed on a display device.

Means for Solving the Problem

A conductive film for solving the abovementioned problem is a conductive film provided in a touch panel, comprising: a transparent dielectric layer having a first surface and a second surface on the opposite side to the first surface, the first surface being disposed on an operating surface side of a touch panel in relation to the second surface; a first lattice formed by a plurality of first electrode wires disposed on the first surface; and a second lattice formed by a plurality of second electrode wires disposed on the second surface, wherein the second lattice includes an enlargement region; the first lattice includes a facing region lying over the enlargement region with the transparent dielectric layer therebetween; and when one of the directions in which the plurality of first electrode wires are arranged in the facing region is a placement direction, and, in the placement direction, the interval at which the second electrode wires in the enlargement region are arranged is greater than the interval at which the first electrode wires in the facing region are arranged, and the enlargement region and the facing region are seen from a position in front of said regions, then one second electrode wire is positioned between two first electrode wires which are adjacent to each other in the placement direction.

According to the abovementioned configuration, when the enlargement region and the facing region are seen from a position other than in front of said regions, which is any observation position where a viewer might be located, the shape of the lattice lines of the second lattice observed within the same plane as the first lattice is visible offset in a direction approaching a position in front of the viewer in relation to the actual lattice lines of the second lattice. The shape of the lattice lines of the second lattice can be seen in such a way as to approach the positions of the lattice lines of a lattice having the same lattice pattern as the first lattice in a pattern in which said lattice is superimposed on the first lattice within the first surface. When it is wished to cause an observer to observe, as an electrode wire pattern, a pattern in which a second lattice having the same lattice pattern as the first lattice is superimposed on the first lattice, it is therefore possible to suppress an offset, from an ideal distance, of the distance between the shape of the first electrode wires and the shape of the second electrode wires observed by an observer in the enlargement region and the facing region. It is therefore possible to suppress formation by the observed electrode wire pattern of a pattern which is distorted in relation to an ideal electrode wire pattern, so a reduction in the quality of an image observed on a display device employing a touch panel comprising this conductive film is suppressed.

In the abovementioned configuration, the second lattice may have a lattice pattern in which a reference lattice is enlarged, the reference lattice constituting an imaginary lattice having a lattice pattern the same as the first lattice.

According to the abovementioned configuration, the second lattice pattern is easily formed.

In the abovementioned configuration, the reference lattice may be positioned in such a way that lattice points of said reference lattice are located in a central portion within the cells of the first lattice, and a new lattice is formed by a combination of the first lattice and the reference lattice; and the second lattice may have a lattice pattern in which the reference lattice is enlarged, centred on an interior point of a region in which the reference lattice is positioned.

According to the abovementioned configuration, as the distance away from the abovementioned point increases, the distance between the lattice lines of the reference lattice, which is the pattern that it is desired to make the observer see, and the lattice lines of the second lattice corresponding to said lattice lines in an enlarged pattern has a tendency to increase. As the distance away from a position in front of the observer increases, a positional difference which is the offset between the position of the actual lattice lines and the position of the shape of the lattice lines observed increases, whereas it is possible to increase the difference between the positions of the lattice lines of the reference lattice and the lattice lines of the second lattice in regions where this positional difference is large by setting the abovementioned point in such a way as to be located in front of the observer. As a result, it is possible to suppress an increase in the offset from an ideal distance of the distance between the shapes of the first electrode wires and the shapes of the second electrode wires observed by an observer, caused by enlargement of the positional difference commensurate with the distance from a position in front.

In the abovementioned configuration, the interior point may be a reference point and a point remote from the reference point within the first surface may be a target point, as seen from a direction facing the first surface; when an observer views the target point from a position in front of the reference point on a side facing the first surface, an offset in a direction along the first surface, between the position of a shape of a structure within the second surface observed at the position of the target point on the first surface, and the position of said structure on the second surface, may be a positional difference; and the second lattice may have a lattice pattern in which the reference lattice is enlarged by a scale factor according to which a portion of the reference lattice positioned at the target point is disposed at a position remote by the positional difference from the target point as a result of the enlargement.

According to the abovementioned configuration, it is possible to correctly suppress, at the target point, an offset in the position of the shape of the second lattice observed by an observer from the positions of the lattice lines of the reference lattice which is the pattern that it is desired to make the observer see. By making the target point the furthest point from the reference point within the region in which distortion of the electrode wire pattern is to be suppressed, it is possible to suppress formation by the observed electrode wire pattern of a pattern which is distorted in relation to the ideal electrode wire pattern in the whole of that region.

In the abovementioned configuration, the scale factor of enlargement of the second lattice in relation to the reference lattice may be constant in each direction centred on the interior point.

According to the abovementioned configuration, the second lattice pattern is easily formed.

In the abovementioned configuration, the scale factor of enlargement of the second lattice in relation to the reference lattice may differ in some directions from other directions centred on the interior point.

According to the abovementioned configuration, the second lattice pattern can be finely set in accordance with the size and shape of the region in which the first lattice and the second lattice are disposed and the position at which a display device employing a touch panel comprising the conductive film is disposed in relation to the observer, among other things, in such a way that an offset in the shape of the observed lattice lines of the second lattice from the positions of the lattice lines of the reference lattice is suppressed in each region within the first surface.

In the abovementioned configuration, the scale factor of enlargement of the second lattice in relation to the reference lattice may increase away from the interior point.

According to the abovementioned configuration, by setting the abovementioned point in such a way as to be located in front of an observer, it is possible to further increase the difference between the positions of the lattice lines of the reference lattice and the lattice lines of the second lattice in regions where the positional difference is large. It is therefore possible to suppress an increase in the offset from an ideal distance of the distance between the shapes of the first electrode wires and the shapes of the second electrode wires observed by an observer caused by enlargement of the positional difference commensurate with the distance from a position in front.

In the abovementioned configuration, the second lattice may include a plurality of regions in which the arrangement intervals of the second electrode wires are different, and at least one of these regions may be the enlargement region.

According to the abovementioned configuration, the second lattice pattern can be finely set in accordance with the size and shape of the region in which the first lattice and the second lattice are disposed and the position at which a display device employing a touch panel comprising the conductive film is disposed in relation to the observer, among other things, in such a way that an offset in the shape of the observed lattice lines of the second lattice from an ideal pattern is suppressed in each region within the first surface.

A touch panel for solving the abovementioned problem comprises: the abovementioned conductive film; a cover layer for covering the conductive film; and peripheral circuitry for measuring electrostatic capacity between electrodes formed by the first electrode wires and electrodes formed by the second electrode wires.

According to the abovementioned configuration, it is possible to suppress formation by an observed electrode wire pattern of a pattern which is distorted in relation to an ideal electrode wire pattern in a touch panel. It is therefore possible to suppress a reduction in the quality of an image observed in a display device comprising the abovementioned touch panel.

A display device for solving the abovementioned problem comprises: a display panel having a plurality of pixels arranged in a lattice shape to display information; a touch panel which transmits the information displayed by the display panel; and a control unit for controlling driving of the touch panel, wherein the touch panel is the touch panel described above.

According to the abovementioned configuration, it is possible to realize a display device which suppresses a reduction in the quality of an observed image.

Advantage of the Invention

According to the present invention, it is possible to suppress a reduction in the quality of an image observed on a display device.

MODE OF EMBODIMENT OF THE INVENTION

A mode of embodiment of a conductive film, a touch panel and a display device will be described with reference to FIG. 1-FIG. 12. It should be noted that the drawings schematically show the configuration of the conductive film, touch panel and display device in order to illustrate a mode of embodiment thereof, and the size proportions of each element in the configurations depicted may differ from the actual proportions.

[Configuration of Display Device]

The configuration of the display device will be described with reference to FIG. 1.

Figure 1:
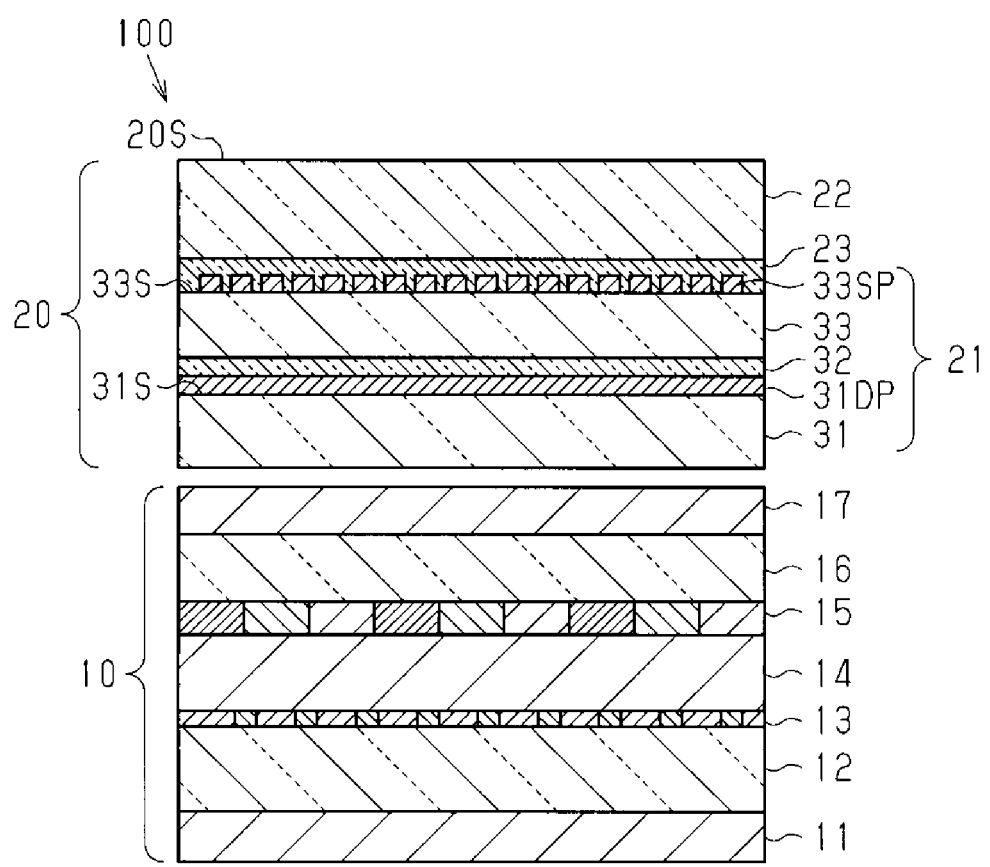
FIG. 1 is a view in cross section showing the cross-sectional structure of a display device in regard to a mode of embodiment of a display device.

As shown in FIG. 1, a display device 100 comprises, for example, a lamination in which a display panel 10 which is a liquid crystal panel, and a touch panel 20 are bonded together by means of one transparent adhesion layer which is not depicted, and further comprises a circuit for driving the touch panel 20 and a control unit for controlling driving of the touch panel 20. It should be noted that the abovementioned transparent adhesion layer may be omitted, provided that the relative positions of the display panel 10 and the touch panel 20 are fixed by another structural element such as an enclosure.

A substantially rectangular display surface is defined on the surface of the display panel 10 and information such as images based on image data is displayed on the display surface.

The structural elements forming the display panel 10 are arranged in the following manner in succession from the structural element furthest from the touch panel 20. That is to say, the following are located in decreasing distance order from the touch panel 20: a lower-side polarizing plate 11, a thin-film transistor (referred to below as TFT) substrate 12, a TFT layer 13, a liquid crystal layer 14, a colour filter layer 15, a colour filter substrate 16, and an upper-side polarizing plate 17.

Among these components, pixel electrodes forming sub-pixels are positioned in the form of a matrix in the TFT layer 13. Furthermore, a black matrix of the colour filter layer 15 has the shape of a lattice formed by a plurality of unit cells having a rectangular shape. By virtue of this lattice shape, the black matrix defines a plurality of regions having a rectangular shape serving as regions facing each of the sub-pixels, and coloured layers for changing white light to light of any colour from among red, green and blue are positioned in each region defined by the black matrix.

It should be noted that if the display panel 10 is an EL panel for outputting coloured light, comprising a red pixel for outputting red light, a green pixel for outputting green light, and a blue pixel for outputting blue light, then the abovementioned colour filter layer 15 may be omitted. In this case, boundary portions between adjacent pixels of the EL panel function as the black matrix. Furthermore, the display panel 10 may be a plasma panel for emitting light by means of electrical discharge, in which case boundary portions defining a red phosphor layer, a green phosphor layer and a blue phosphor layer function as the black matrix.

The touch panel 20 is an electrostatic-capacitive touch panel and constitutes a laminate in which a conductive film 21 and a cover layer 22 are bonded together by means of a transparent adhesion layer 23, the laminate being light transmissive so as to transmit information displayed by the display panel 10.

Specifically, among the structural elements forming the touch panel 20, the following are positioned in succession from the structural element closest to the touch panel 10: a transparent substrate 31, a plurality of drive electrodes 31DP, a transparent adhesion layer 32, a transparent dielectric substrate 33, a plurality of sensing electrodes 33SP, the transparent adhesion layer 23, and the cover layer 22. Among these, the transparent substrate 31, drive electrodes 31DP, transparent adhesion layer 32, transparent dielectric substrate 33, and sensing electrodes 33SP form the conductive film 21.

The transparent substrate 31 has insulating properties and light transmission properties so as to transmit information such as images displayed by the display surface of the display panel 10, and is placed over the whole of the display surface. The transparent substrate 31 is formed from a base material such as a transparent glass substrate, a transparent resin film, or a silicon substrate, for example. Examples of resins which may be used for the transparent substrate 31 include polyethylene terephthalate (PET), polymethyl methacrylate (PMMA), polypropylene (PP), and polystyrene (PS). The transparent substrate 31 may be a single-layer structure comprising one base material or it may be a multilayer structure in which two or more base materials are stacked.

The surface of the transparent substrate 31 on the opposite side to the display panel 10 is set as a drive electrode surface 31S, and the plurality of drive electrodes 31DP are disposed on the drive electrode surface 31S. The plurality of drive electrodes 31DP and the portions of the drive electrode surface 31S where the drive electrodes 31DP are not positioned are bonded to the transparent dielectric substrate 33 by means of the single transparent adhesion layer 32.

The transparent adhesion layer 32 has light transmission properties so as to transmit the information such as images displayed on the display surface, and a polyether-based adhesive or acrylic adhesive, or the like, is used for the transparent adhesion layer 32, for example.

The transparent dielectric substrate 33 has light transmission properties so as to transmit the information such as images displayed on the display surface, and a dielectric constant suitable for detecting electrostatic capacity between electrodes. The transparent dielectric substrate 33 is formed from a base material such as a transparent glass substrate, a transparent resin film, or a silicon substrate, for example. Examples of resins which may be used for the transparent dielectric substrate 33 include PET, PMMA, PP and PS. The transparent dielectric substrate 33 may be a single-layer structure comprising one base material or it may be a multilayer structure in which two or more base materials are stacked.

The plurality of drive electrodes 31DP are bonded to the transparent dielectric substrate 33 by means of the transparent adhesion layer 32, and as a result the plurality of drive electrodes 31DP are arranged on a rear surface of the transparent dielectric substrate 33 on a surface facing the transparent substrate 31.

The surface of the transparent dielectric substrate 33 on the opposite side to the transparent adhesion layer 32 is set as a sensing electrode surface 33S, and the plurality of sensing electrodes 33SP are disposed on the sensing electrode surface 33S. That is to say, the transparent dielectric substrate 33 is interposed between the plurality of drive electrodes 31DP and the plurality of sensing electrodes 33SP. The plurality of sensing electrodes 33SP and the portions of the sensing electrode surface 33S where the sensing electrodes 33SP are not positioned are bonded to the cover layer 22 by means of the single transparent adhesion layer 23.

The transparent adhesion layer 23 has light transmission properties so as to transmit the information such as images displayed on the display surface, and a polyether-based adhesive or acrylic adhesive, or the like, is used for the transparent adhesion layer 23, for example. The type of adhesive used for the transparent adhesion layer 23 may be a wet-lamination adhesive, or it may be a dry-lamination adhesive or hot-lamination adhesive.

The cover layer 22 is formed from a glass substrate such as reinforced glass or a resin film, etc., and the surface of the cover layer 22 on the opposite side to the transparent adhesion layer 23 functions as an operating surface 20S, which is the surface of the touch panel 20. In the conductive film 21, the front surface of the transparent dielectric substrate 33 is the surface positioned on the side of the operating surface 20S of the touch panel 20, as compared with the rear surface of the transparent dielectric substrate 33.

It should be noted that among the abovementioned structural elements, the transparent adhesion layer 23 may be omitted. In a configuration in which the transparent adhesion layer 23 is omitted, the surface of the cover layer 22 facing the transparent dielectric substrate 33 should be set as the sensing electrode surface 33S, and the plurality of sensing electrodes 33SP should be formed by patterning of one thin film formed on the sensing electrode surface 33S.

Furthermore, when the touch panel 20 is produced, it is possible to use a method in which the conductive film 21 and the cover layer 22 are bonded by means of the transparent adhesion layer 23, and the following production method may also be used as an example of a method other than said production method. That is to say, a thin-film layer comprising a conductive metal such as copper is formed, directly or with an underlayer interposed, on the cover layer 22 such as a resin film, and a resist layer having the shape of the pattern of the sensing electrodes 33SP is formed on the thin-film layer. The thin-film layer is then processed to the shape of the plurality of sensing electrodes 33SP by means of a wet etching method employing ferric chloride or the like, whereby a first film is obtained. Furthermore, a thin-film layer formed on another resin film functioning as the transparent substrate 31 is processed to the shape of the plurality of drive electrodes 31DP in the same way as the sensing electrodes 33SP, whereby a second film is obtained. The first film and the second film are then bonded by means of the transparent adhesion layers 23, 32 to the transparent dielectric substrate 33 in such a way that the transparent dielectric substrate 33 is interposed therebetween.

[Planar Structure of Conductive Film]

The planar structure of the conductive film 21 will be described with reference to FIG. 2, focusing on the positional relationship of the sensing electrodes 33SP and the drive electrodes 31DP. It should be noted that in FIG. 2, the conductive film 21 is seen from a direction facing the front surface of the transparent dielectric substrate 33, and each strip-shaped region extending along a transverse direction bounded by the two-dot chain lines shows a region in which one sensing electrode 33SP is disposed, and each strip-shaped region extending along a longitudinal direction bounded by the two-dot chain lines shows a region in which one drive electrode 31DP is disposed. Moreover, the numbers of sensing electrodes 33SP and drive electrodes 31DP are shown in a simplified form.

Figure 2:
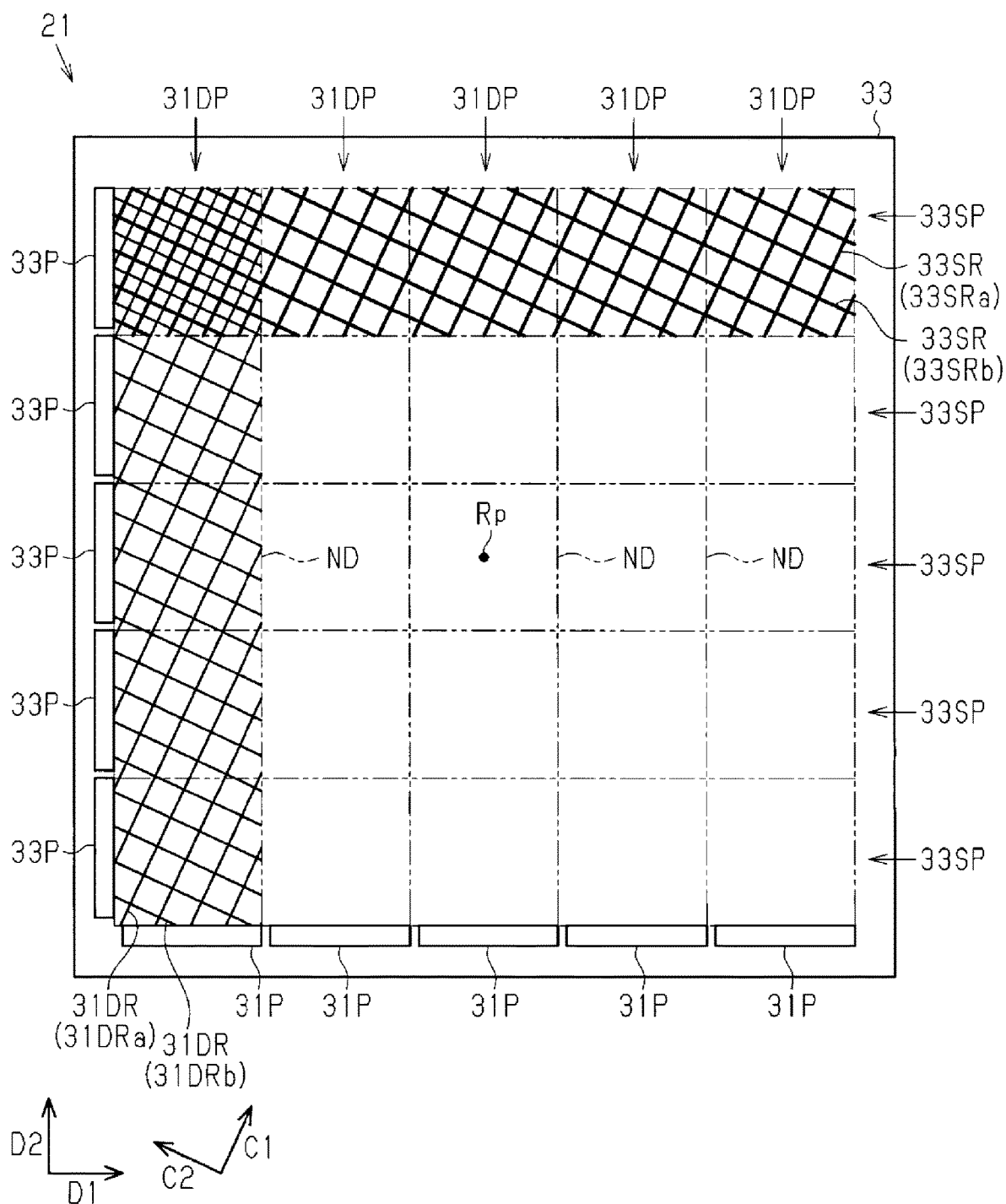
FIG. 2 is a plan view showing the planar structure of a conductive film according to a mode of embodiment.

Furthermore, in order to simplify understanding of the configuration of the sensing electrodes 33SP and the drive electrodes 31DP, the sensing electrode wires forming the sensing electrodes 33SP are shown by thick lines only for the sensing electrodes 33SP positioned on the uppermost side of FIG. 2, and the drive electrode wires forming the drive electrodes 31DP are shown by narrow lines only for the drive electrodes 31DP positioned on the far left-hand side of FIG. 2.

As shown in FIG. 2, the plurality of sensing electrodes 33SP on the sensing electrode surface 33S of the transparent dielectric substrate 33 each have the shape of a band extending along a first electrode direction D1 constituting one direction, and are arranged along a second electrode direction D2 intersecting the first electrode direction D1. Each of the sensing electrodes 33SP is insulated from another adjacent sensing electrode 33SP.

The sensing electrodes 33SP include a plurality of sensing electrode wires 33SR. The plurality of sensing electrode wires 33SR include a plurality of sensing electrode wires 33SRa extending along a first intersection direction C1, and a plurality of sensing electrode wires 33SRb extending along a second intersection direction C2 orthogonal to the first intersection direction C1. The first intersection direction C1 differs from both the first electrode direction D1 and the second electrode direction D2 and is inclined with respect to both of said directions. Furthermore, the second intersection direction C2 also differs from both the first electrode direction D1 and the second electrode direction D2 and is inclined with respect to both of said directions.

A rectangular lattice-shaped pattern is formed on the sensing electrode surface 33S by the intersections of the plurality of sensing electrode wires 33SRa and the plurality of sensing electrode wires 33SRb.

A metallic film such as copper, silver or aluminium is used as the material forming the sensing electrode wires 33SR, and the sensing electrode wires 33SR are formed by using etching to pattern the metallic film formed on the sensing electrode surface 33S, for example. The sensing electrode wires 33SR are connected to a sensing pad 33P provided for each sensing electrode 33SP at one end of each sensing electrode 33SP in the first electrode direction D1. Each of the plurality of sensing electrodes 33SP is then separately connected via the sensing pad 33P to a detection circuit which is an example of peripheral circuitry of the touch panel 20, and a current value is measured by means of the detection circuit.

The plurality of drive electrodes 31DP on the drive electrode surface 31S of the transparent substrate 31 each have the shape of a band extending along the second electrode direction D2 and are arranged along the first electrode direction D1. Each of the drive electrodes 31DP is insulated from another adjacent drive electrode 31DP.

The drive electrodes 31DP include a plurality of drive electrode wires 31DR. The plurality of drive electrode wires 31DR include a plurality of drive electrode wires 31DRa extending along the first intersection direction C1, and a plurality of drive electrode wires 31DRb extending along the second intersection direction C2. A rectangular lattice-shaped pattern is formed on the drive electrode surface 31S by the intersections of the plurality of drive electrode wires 31DRa and the plurality of drive electrode wires 31DRb.

A metallic film such as copper, silver or aluminium is used as the material forming the drive electrode wires 31DR, and the drive electrode wires 31DR are formed by using etching to pattern the metallic film formed on the drive electrode surface 31S, for example. The drive electrode wires 31DR are connected to a drive pad 31P provided for each drive electrode 31DP at one end of each drive electrode 31DP in the second electrode direction D2. Each of the plurality of drive electrodes 31DP is then separately connected via the drive pad 31P to a selection circuit which is an example of peripheral circuitry of the touch panel 20, and a drive signal output by the selection circuit is received, whereby a drive circuit is selected by the selection circuit.

An overlapping portion of the sensing electrodes 33SP and the drive electrodes 31DP, as seen from a direction facing the front surface of the transparent dielectric substrate 33, constitutes a capacity detector ND having a square shape defined by the two-dot chain lines in FIG. 2. One capacity detector ND constitutes a portion where one sensing electrode 33SP and one drive electrode 31DP intersect in three dimensions, and is the smallest unit of the touch panel 20 enabling detection of a position touched by a finger or the like of the user.

A reference point Rp is set for each of the sensing electrode surface 33S and the drive electrode surface 31S. The reference point Rp on the sensing electrode surface 33S and the reference point Rp on the drive electrode surface 31S are aligned when seen from a direction facing the front surface of the transparent dielectric substrate 33. In other words, the reference point Rp is set for a pattern formed by the sensing electrode wires 33SR and a pattern formed by the drive electrode wires 31DR, respectively, and the reference point Rp is one point seen from a position in front of a region including the reference point Rp. The reference point Rp is set in such a way that when an observer looks at the display device 100 at a normal observation position, said reference point is positioned in front of the observer. A normal observation position is the position where an image displayed on the display surface of the display device 100 can be seen most easily by an observer of average height, for example. The reference point Rp is positioned in the centre of the sensing electrode surface 33S and in the centre of the drive electrode surface 31S, for example.

It should be noted that the method for forming the sensing electrode wires 33SR and the drive electrode wires 31DR is not limited to the etching mentioned above, and examples of other methods which may be used include printing methods.

[Planar Structure of Display Panel]

The planar structure of the colour filter layer 15 of the display panel 10, in other words the pixel arrangement in the display panel 10, will be described with reference to FIG. 3.

Figure 3:
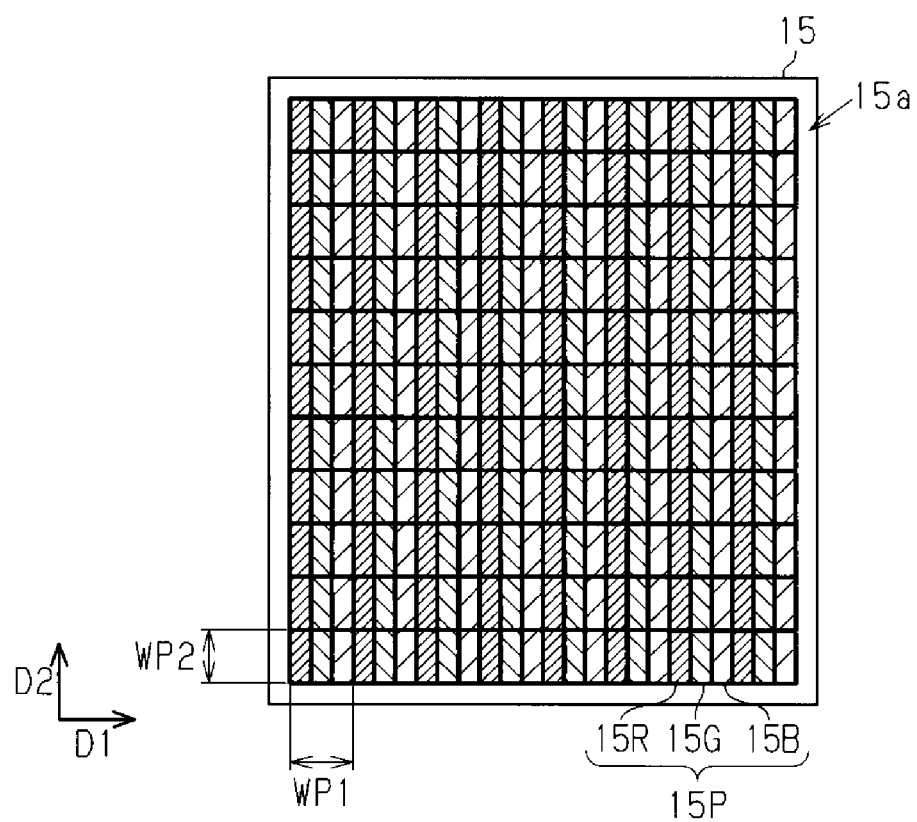
FIG. 3 is a plan view showing a pixel arrangement of a display panel according to a mode of embodiment.

As shown in FIG. 3, a black matrix 15a of the colour filter layer 15 has a lattice pattern comprising a plurality of unit cells having a rectangular shape arranged along the first electrode direction D1 and the second electrode direction D2. One pixel 15P comprises three unit cells which are continuous along the first electrode direction D1, and the plurality of pixels 15P are arranged in the form of a lattice along the first electrode direction D1 and the second electrode direction D2.

Each of the plurality of pixels 15P comprises: a red coloured layer 15R for displaying a red colour, a green coloured layer 15G for displaying a green colour, and a blue coloured layer 15B for displaying a blue colour. The red coloured layer 15R, green coloured layer 15G and blue coloured layer 15B are repeatedly arranged in that order along the first electrode direction D1 of the colour filter layer 15, for example. Furthermore, the plurality of red coloured layers 15R are arranged continuously along the second electrode direction D2, the plurality of green coloured layers 15G are arranged continuously along the second electrode direction D2, and the plurality of blue coloured layers 15B are arranged continuously along the second electrode direction D2.

One red coloured layer 15R, one green coloured layer 15G and one blue coloured layer 15B form one pixel 15P, and the plurality of pixels 15P are arranged along the first electrode direction D1 in a state in which the arrangement order of the red coloured layer 15R, green coloured layer 15G and blue coloured layer 15B in the first electrode direction D1 is maintained. Furthermore, in other words the plurality of pixels 15P are disposed in the form of stripes extending along the second electrode direction D2.

The width of a pixel 15P along the first electrode direction D1 is a first pixel width WP1, and the width of a pixel 15P along the second electrode direction D2 is a second pixel width WP2. The first pixel width WP1 and the second pixel width WP2 are each set as a value commensurate with the size of the display panel 10 and the required resolution of the display panel 10, among other things.

[Electrical Configuration of Touch Panel]

The electrical configuration of the touch panel 20 will be described together with the function of the control unit of the display device 100, with reference to FIG. 4. It should be noted that the electrical configuration of a mutual-capacitive touch panel 20 will be described below as an example of an electrostatic-capacitive touch panel 20.

Figure 4:
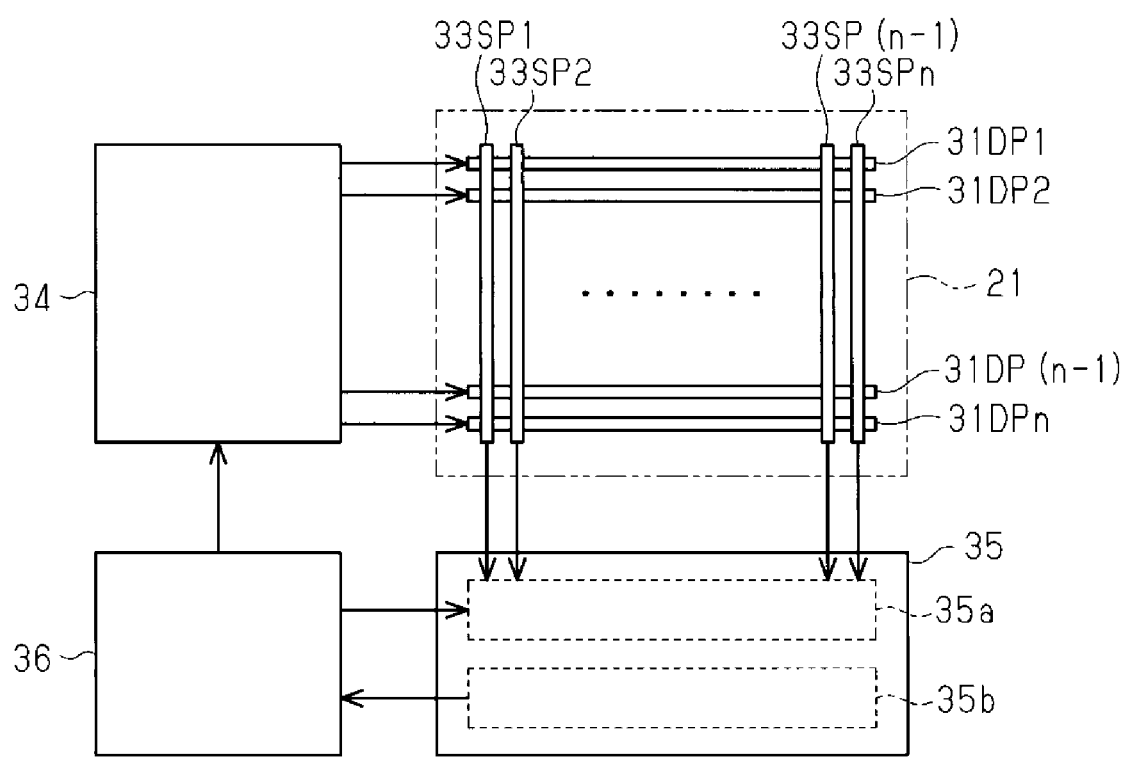
FIG. 4 is a schematic diagram to illustrate the electrical configuration of a touch panel according to a mode of embodiment.

As shown in FIG. 4, the touch panel 20 comprises a selection circuit 34 and a detection circuit 35 as peripheral circuitry. The selection circuit 34 is connected to the plurality of drive electrodes 31DP and the detection circuit 35 is connected to the plurality of sensing electrodes 33SP, and a control unit 36 of the display device 100 is connected to the selection circuit 34 and the detection circuit 35.

The control unit 36 generates and outputs a start timing signal for causing the selection circuit 34 to start generating a drive signal for each drive electrode 31DP. The control unit 36 generates and outputs a scan timing signal for causing the selection circuit 34 to successively scan a target drive electrode to which the drive signal is supplied, from a first drive electrode 31DP1 to an $n^{th}$ drive electrode 31DPn.

The control unit 36 generates and outputs a start timing signal for causing the detection circuit 35 to start detecting a current flowing through each sensing electrode 33SP. The control unit 36 generates and outputs a scan timing signal for causing the detection circuit 35 to successively scan a detection target sensing electrode, from a first sensing electrode 33SP1 to an $n^{th}$ sensing electrode 33SPn.

The selection circuit 34 starts to generate a drive signal in accordance with the start timing signal output by the control unit 36, and scans the drive signal output destination from the first drive electrode 31DP1 to the $n^{th}$ drive electrode 31DPn in accordance with the scan timing signal output by the control unit 36.

The detection circuit 35 comprises a signal acquisition unit 35a and a signal processing unit 35b. The signal acquisition unit 35a starts to acquire a current signal, which is an analogue signal generated by each sensing electrode 33SP, in accordance with the start timing signal output by the control unit 36. The signal acquisition unit 35a then scans an acquisition source of the current signal from the first sensing electrode 33SP1 to the $n^{th}$ sensing electrode 33SPn in accordance with the scan timing signal output by the control unit 36.

The signal processing unit 35b processes each current signal acquired by the signal acquisition unit 35a to generate a voltage signal, which is a digital value, and outputs the generated voltage signal to the control unit 36. In this way, the selection circuit 34 and the detection circuit 35 measure a change in electrostatic capacity between the drive electrodes 31DP and the sensing electrodes 33SP by generating a voltage signal from a current signal which varies according to the change in electrostatic capacity.

The control unit 36 detects a position at which a finger or the like of a user contacts the touch panel 20, in accordance with the voltage signal output by the signal processing unit 35b, and information of the detected position is used for various types of processing such as generating information displayed on the display surface of the display panel 10. It should be noted that the touch panel 20 is not necessarily the abovementioned mutual-capacitive touch panel 20, and it may equally be a self-capacitive touch panel.

[Configuration of Sensing Electrodes and Drive Electrodes]

Figure 5:
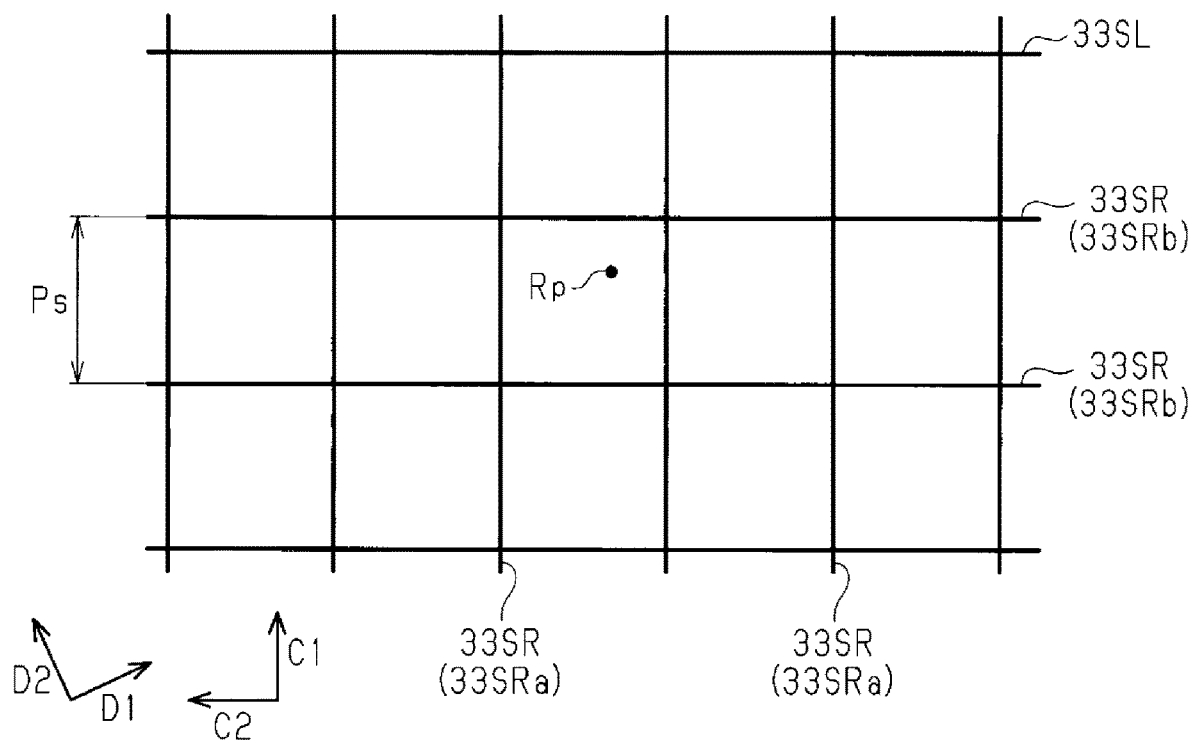
FIG. 5 is an enlargement of the configuration of a sensing electrode according to a mode of embodiment.

The detailed configuration of the sensing electrodes 33SP and the drive electrodes 31DP will be described with reference to FIG. 5 and FIG. 6. FIG. 5 shows a portion of a sensing electrode 33SP, and FIG. 6 shows a portion of a drive electrode 31DP.

As shown in FIG. 5, a sensing lattice 33SL having a rectangular lattice pattern is disposed on the sensing electrode surface 33S, as seen from a direction facing the front surface of the transparent dielectric substrate 33. The sensing lattice 33SL comprises the plurality of sensing electrode wires 33SRa extending along the first intersection direction C1, and the plurality of sensing electrode wires 33SRb extending along the second intersection direction C2. The plurality of sensing electrode wires 33SRa are arranged in parallel along the second intersection direction C2, and the plurality of sensing electrode wires 33SRb are arranged in parallel along the first intersection direction C1.

A sensing lattice pitch Ps which is the arrangement interval of the sensing electrode wires 33SR in the sensing lattice 33SL is constant in both the first intersection direction C1 and the second intersection direction C2, and the unit cells of the sensing lattice 33SL have a square shape in which the length of one side is the sensing lattice pitch Ps, when seen from a position in front of the unit cells.

Figure 6:
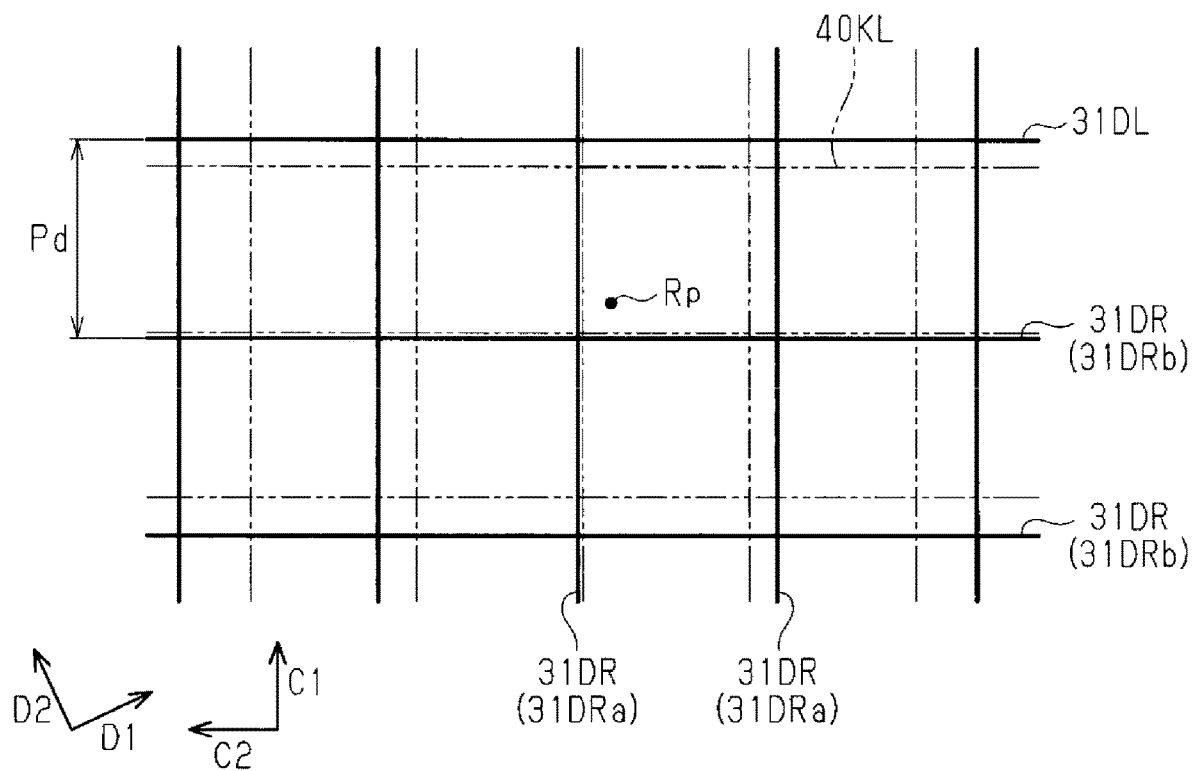
FIG. 6 is an enlargement of the configuration of a drive electrode according to a mode of embodiment.

As shown in FIG. 6, a drive lattice 31DL having a rectangular lattice pattern is disposed on the drive electrode surface 31S, as seen from a direction facing the front surface of the transparent dielectric substrate 33. The drive lattice 31DL comprises the plurality of drive electrode wires 31DRa extending along the first intersection direction C1, and the plurality of drive electrode wires 31DRb extending along the second intersection direction C2. The plurality of drive electrode wires 31DRa are arranged in parallel along the second intersection direction C2, and the plurality of drive electrode wires 31DRb are arranged in parallel along the first intersection direction C1.

A drive lattice pitch Pd which is the arrangement interval of the drive electrode wires 31DR in the drive lattice 31DL is constant in both the first intersection direction C1 and the second intersection direction C2, and the unit cells of the drive lattice 31DL have a square shape in which the length of one side is the drive lattice pitch Pd, when seen from a position in front of the unit cells. The drive lattice pitch Pd is greater than the sensing lattice pitch Ps.

Here, an imaginary lattice in which the sensing lattice 33SL is disposed offset by half of the sensing lattice pitch Ps in each of the first intersection direction C1 and the second intersection direction C2 constitutes a reference lattice 40KL. In other words, the reference lattice 40KL is a pattern of an imaginary lattice having the same lattice pattern as the sensing lattice 33SL, disposed at a different position from that of the sensing lattice 33SL in a direction along the front surface of the transparent dielectric substrate 33. In FIG. 6, the reference lattice 40KL is shown by the two-dot chain lines. The reference lattice 40KL may be positioned on either the sensing electrode surface 33S or the drive electrode surface 31S in a state in which its position in a direction along the front surface of the transparent dielectric substrate 33 is maintained.

The drive lattice 31DL has a lattice pattern in which the reference lattice 40KL is enlarged by a predetermined scale factor on the drive electrode surface 31S, along each of the first electrode direction D1 and the second electrode direction D2, centred on the reference point Rp. This predetermined scale factor is an enlargement ratio ER, and the drive lattice pitch Pd is a value obtained by multiplying the sensing lattice pitch Ps by the enlargement ratio ER.

It should be noted that the reference lattice 40KL is a lattice comprising a combination of ideal straight lines which do not have a line width, and should be consistent with the line width of the sensing electrode wires 33SR and the line width of the drive electrode wires 31DR.

[Shape Formed by Electrode Wire Pattern]

The positional relationship of the sensing electrode wires 33SR and the drive electrode wires 31DR, and the apparent shape formed by these electrode wires will be described with reference to FIG. 7-FIG. 10.

Figure 7:
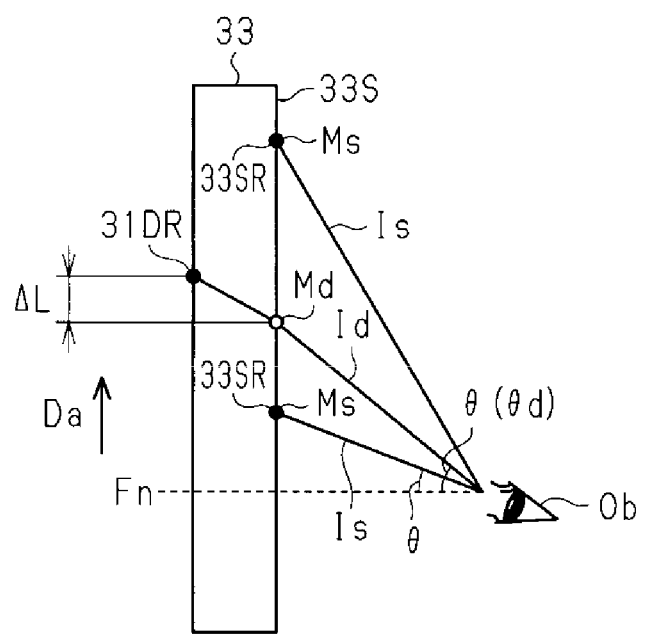
FIG. 7 schematically shows an offset between the actual position of a drive electrode wire and the observed position of the shape of a drive electrode wire.

As shown in FIG. 7, the transparent dielectric substrate 33 is present between the sensing electrode wires 33SR and the drive electrode wires 31DR. The sensing electrode wires 33SR are disposed at positions closer to the operating surface 20S than the drive electrode wires 31DR, in other words at positions closer to an observer Ob. Here, in a region in which an observation angle θ, which is an angle formed by the line of vision direction of the observer Ob and a direction orthogonal to the sensing electrode surface 33S which is the surface of the transparent dielectric substrate 33, is an angle other than 0°, light Id exiting from the drive electrode wire 31DR positioned on the rear surface of the transparent dielectric substrate 33 is transmitted by the transparent dielectric substrate 33 after which it is refracted and advances to the observer Ob. Furthermore, light Is exiting from the sensing electrode wires 33SR is unaffected by the thickness or refraction of the transparent dielectric substrate 33 and advances to the observer Ob. The lights Id, Is are reflected by the electrode wires 31DR, 33SR.

When the observer Ob recognizes as one pattern the pattern formed by the sensing electrode wires 33SR and the drive electrode wires 31DR, the observer Ob perceives the shapes of the sensing electrode wires 33SR and the shapes of the drive electrode wires 31DR as shapes positioned within one plane. For example, when the shapes Ms of the sensing electrode wires 33SR and the shapes Md of the drive electrode wires 31DR are perceived as shapes positioned within the sensing electrode surface 33S, the shapes Ms of the sensing electrode wires 33SR are observed at the positions in which the sensing electrode wires 33SR are actually present. On the other hand, the shape Md of the drive electrode wires 31DR is observed at a position at which the path of the light Id and the sensing electrode surface 33S intersect. When an observation angle θd, which is the observation angle θ at the position where the shape Md is observed, is an angle other than 0°, a direction from a position in front Fn at which the observation angle θ is 0° towards the position at which the shape Md is observed on the sensing electrode surface 33S, is an observation direction Da, and the position of the shape Md in the observation direction Da differs from the actual position of the drive electrode wires 31DR in the observation direction Da.

Specifically, the position of the shape Md in the observation direction Da is offset in a direction approaching the position in front Fn in relation to the actual position of the drive electrode wires 31DR on the rear surface of the transparent dielectric substrate 33. For example, when the observation direction Da is a direction from below to above for the observer Ob, the position of the shape Md in the observation direction Da is offset to the lower side from the actual position of the drive electrode wires 31DR. The positional difference ΔL is the difference between the position of the shape Md in the observation direction Da and the actual position of the drive electrode wires 31DR. As the observation angle θd increases, in other words as the distance away from the position in front Fn increases, so the positional difference ΔL increases.

As a result, the distance in the observation direction Da between the shapes Ms of the sensing electrode wires 33SR and the shape Md of the drive electrode wires 31DR is offset by the positional difference ΔL from the actual distance between the sensing electrode wires 33SR and the drive electrode wires 31DR. Accordingly, even if the positional relationship of the sensing electrode wires 33SR and the drive electrode wires 31DR has been set to take account of moiré, etc., the pattern formed by the sensing electrode wires 33SR and the drive electrode wires 31DR is apparent as a different pattern from the design pattern, which is the ideal pattern, in a region in which the observation angle θ is other than 0°.

Figure 8:
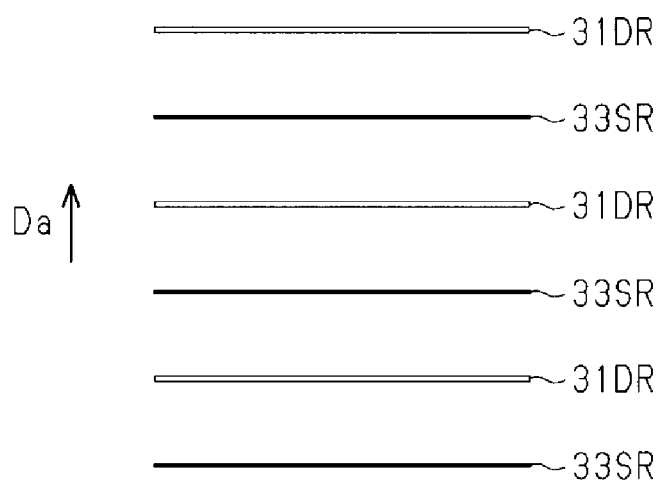
FIG. 8 shows an example of the designed positional relationship of drive electrode wires and sensing electrode wires.
Figure 9:
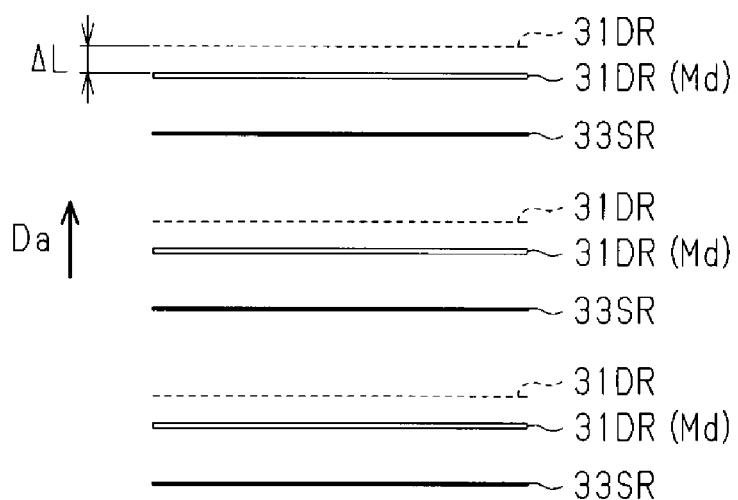
FIG. 9 shows an example of the positional relationship of the shape of drive electrode wires and the shape of sensing electrode wires observed by an observer.

As shown in FIG. 8, for example, when viewed from the front, the sensing electrode wires 33SR and the drive electrode wires 31DR are disposed in such a way as to be arranged alternately at constant intervals in the observation direction Da. In FIG. 8, the sensing electrode wires 33SR are denoted by thick black lines and the drive electrode wires 31DR are denoted by outlines in order to simplify identification of the sensing electrode wires 33SR and the drive electrode wires 31DR. The drive electrode wires 31DR appear offset by the positional difference ΔL, as shown in FIG. 9, when viewed from a position in which the observation angle θ is an angle other than 0° in the region in which these electrode wires are disposed, as compared with viewing from the front. For example, when the observation direction Da is a direction from below to above for the observer Ob, the drive electrode wires 31DR appear to be at a lower position by the positional difference ΔL in comparison with viewing from the front.

Figure 10:
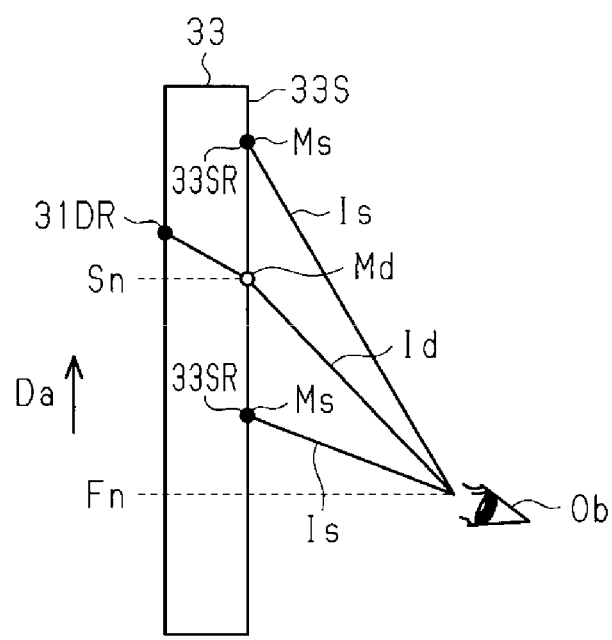
FIG. 10 schematically shows the relationship of the position of a drive electrode wire according to a mode of embodiment and the observed shape of a drive electrode wire.

Here, a measure to suppress the appearance of the pattern formed by the sensing electrode wires 33SR and the drive electrode wires 31DR as a pattern other than the ideal pattern in a region in which the observation angle θ is other than 0° will be described with reference to FIG. 10. That is to say, as shown in FIG. 10, the position of the shape Md of the drive electrode wires 31DR in the observation direction Da should be a position in which the actual position of the drive electrode wires 31DR is further from the position in front Fn than an ideal position Sn of the drive electrode wires 31DR, such that the position of the shape Md of the drive electrode wires 31DR is the ideal position Sn of the drive electrode wires 31DR. According to this mode of embodiment, such a configuration is achieved by employing a pattern for the drive lattice 31DL in which the reference lattice 40KL is enlarged.

It should be noted that layers of the touch panel 20 such as substrates other than the transparent dielectric substrate 33 have been omitted from the description of FIG. 7 and FIG. 10 in order to facilitate understanding. Furthermore, the thickness of the adhesion layer present between the electrode wires and the transparent dielectric substrate 33 is very small so the effect of the adhesion layer on the positional difference ΔL is small enough to be ignored.

[Action]

Figure 11:
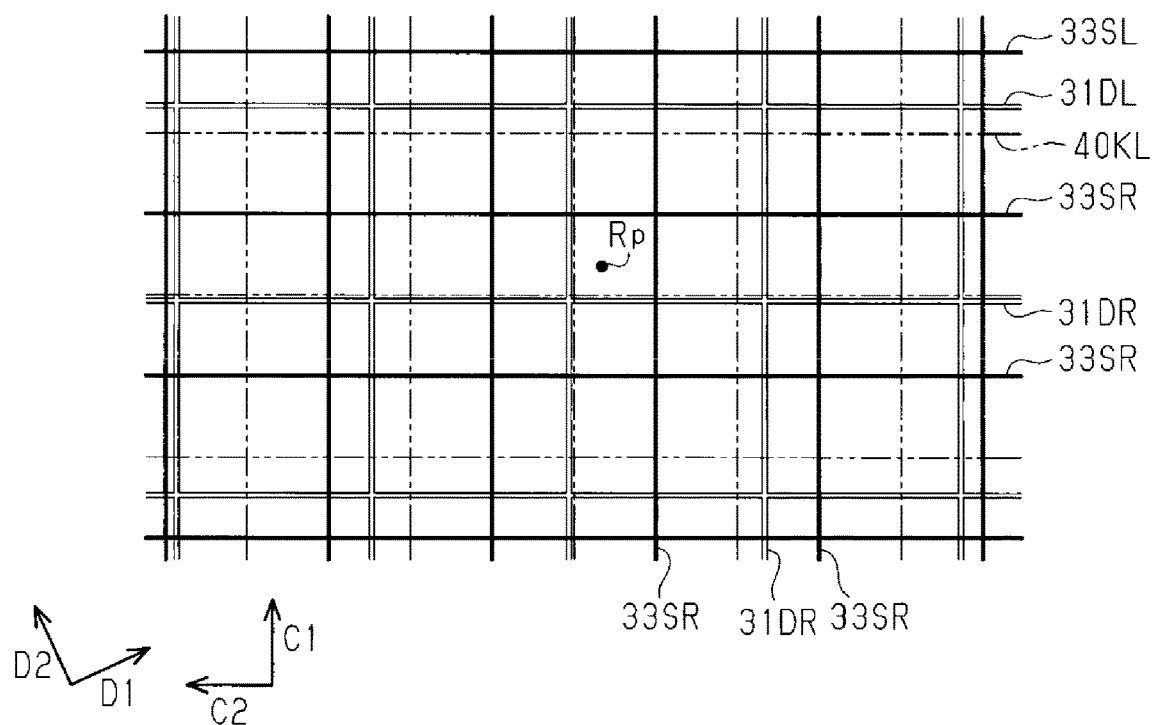
FIG. 11 shows an electrode wire pattern comprising a sensing electrode and a drive electrode according to a mode of embodiment.

The action of this mode of embodiment will be further described on the basis of the abovementioned principle with reference to FIG. 11. As shown in FIG. 11, the sensing lattice 33SL and the drive lattice 31DL of the conductive film 21 according to this mode of embodiment are superimposed in such a way that the reference points Rp are aligned when seen from the front, in order to form an electrode wire pattern. FIG. 11 shows the sensing lattice 33SL and the drive lattice 31DL together with the reference lattice 40KL, and the arrangement of the sensing lattice 33SL and the drive lattice 31DL when each region in FIG. 11 is seen from the front, in other words overlapping of the sensing lattice 33SL and the drive lattice 31DL at the actual position, is shown. Furthermore, in FIG. 11, the sensing electrode wires 33SR are denoted by thick black lines and the drive electrode wires 31DR are denoted by outlines in order to simplify identification of the sensing electrode wires 33SR and the drive electrode wires 31DR. It should be noted that previous FIG. 6 and FIG. 11 show a pattern in which the enlargement ratio ER is exaggerated in order to simplify an understanding of the difference between the positions of the drive lattice 31DL and the reference lattice 40KL.

When each region including the electrode wire pattern is viewed from the front, one drive electrode wire 31DR extending along the first intersection direction C1 is positioned between two sensing electrode wires 33SR extending along the first intersection direction C1 in each region, in other words between two sensing electrode wires 33SR arranged along the second intersection direction C2. Furthermore, when each region is viewed from the front, one drive electrode wire 31DR extending along the second intersection direction C2 is positioned between two sensing electrode wires 33SR extending along the second intersection direction C2, in other words between two sensing electrode wires 33SR arranged along the first intersection direction C1.

The reference lattice 40KL is a pattern of an ideal drive lattice 31DL which it is desired to make the observer Ob see on the sensing electrode surface 33S, and a pattern in which the sensing lattice 33SL and the reference lattice 40KL are superimposed within one plane is an ideal electrode wire pattern which it is desired to make the observer Ob see. When the sensing lattice 33SL and the reference lattice 40KL are superimposed within one plane, lattice points which are points of intersection of the electrode wires in the sensing lattice 33SL are positioned in the central portion within the cells of the reference lattice 40KL, and lattice points of the reference lattice 40KL are positioned in the central portion within the cells of the sensing lattice 33SL. The sensing lattice 33SL and the reference lattice 40KL form a composite lattice which is a new lattice having a rectangular lattice pattern, as a result of said lattices being combined. The unit cells of this composite lattice have a square shape in which the length of one side is half the length of the sensing lattice pitch Ps. The angle formed by the first electrode direction D1 and the first intersection direction C1, and the angle formed by the second electrode direction D2 and the second intersection direction C2 are preferably set at angles which further suppress moiré when the rectangular lattice formed by the black matrix 15a and the composite lattice are superimposed.

According to this mode of embodiment, the drive lattice 31DL is a pattern in which the reference lattice 40KL has been enlarged, centred on the reference point Rp, on the drive electrode surface 31S. Accordingly, when the observer Ob views the electrode wire pattern in such a way that the reference point Rp is at the position in front Fn, the actual positions of the lattice lines of the drive lattice 31DL in the observation direction Da are remote in a direction away from the position in front Fn, in relation to the positions of the lattice lines of the reference lattice 40KL corresponding to the abovementioned lattice lines before enlargement. By virtue of this configuration, the shapes of the lattice lines of the drive lattice 31DL are seen offset in a direction approaching the position in front Fn with respect to the actual lattice lines of the drive lattice 31DL in the observation direction Da, in other words in a direction approaching the lattice lines of the reference lattice 40KL. It is therefore possible to suppress an offset in the positions, in the observation direction Da, of the shape of the drive lattice 31DL which can be seen by the observer Ob on the sensing electrode surface 33S and the reference lattice 40KL. In other words, it is possible to suppress an offset in the position of the shape of the drive lattice 31DL and the position of the ideal drive lattice 31DL in the observation direction Da, and it is possible to suppress an offset from the ideal distance of the distance between the shapes of the sensing electrode wires 33SR and the shapes of the drive electrode wires 31DR in the observation direction Da. Consequently, it is possible to suppress formation by the observed electrode wire pattern of a pattern which is distorted in relation to the ideal electrode wire pattern, and therefore it is possible to suppress observation of moiré in the electrode wire pattern because of a repeating structure having a period different from the design period being partially observed, and a sense of unevenness in the brightness because the density of the electrode wire arrangement appears nonuniform. As a result, it is possible to suppress a reduction in the quality of the image observed on the display device 100.

Here, as described above, the drive lattice 31DL is a pattern in which the reference lattice 40KL has been enlarged, centred on the reference point Rp, and the reference point Rp is the position of the position in front Fn when the observer Ob is viewing the display device 100 at a normal observation position. In this configuration, as the distance away from the reference point Rp increases, there is generally speaking an increase in the difference between the positions of the reference lattice 40KL and the actual drive lattice 31DL, in other words the distance between the lattice lines of the reference lattice 40KL and the drive electrode wires 31DR corresponding to those lattice lines after enlargement. As described above, as the distance away from the position in front Fn increases, the positional difference ΔL of the shapes of the drive electrode wires 31DR and the actual drive electrode wires 31DR increases. Consequently, if the configuration is such that, as the distance away from the reference point Rp increases in the observation direction Da, the actual drive electrode wires 31DR become remote in a direction away from the position in front Fn in relation to the lattice lines of the reference lattice 40KL, then the difference in the positions of the actual drive electrode wires 31DR and the lattice lines of the reference lattice 40KL increases in the portion where the positional difference ΔL increases. Accordingly, it is possible to suppress an increase in the offset of the positions of the shapes of the drive electrode wires 31DR due to the increase in the positional difference ΔL, and it is possible to correctly suppress the offset in the positions, in the observation direction Da, of the shape of the drive lattice 31DL which can be seen by the observer Ob and the reference lattice 40KL.

According to this mode of embodiment, it is thus possible to correctly suppress formation by the observed electrode wire pattern of a pattern which is distorted in relation to the ideal electrode wire pattern, in accordance with the distance from the reference point Rp, while the pattern of the drive lattice 31DL is a pattern which is obtained by means of a simple method which involves uniformly enlarging the reference lattice 40KL, centred on the reference point Rp, by the enlargement ratio ER.

A method for setting the enlargement ratio ER will now be described with reference to FIG. 12.

Figure 12:
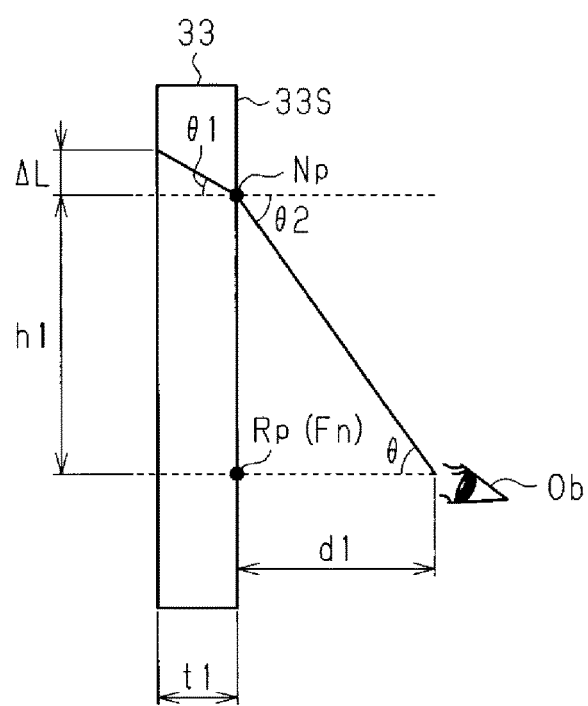
FIG. 12 shows a parameter used for setting an enlargement ratio according to a mode of embodiment.

As shown in FIG. 12, a target point Np which is a point within the plane of the transparent dielectric substrate 33, in other words within the sensing electrode surface 33S, is first of all set. The target point Np is the furthest point from the reference point Rp within the region in which offset of the observed electrode wire pattern is to be suppressed in relation to the ideal electrode wire pattern when the observer Ob observes the display device 100 from a position where the reference point Rp is the position in front Fn. For example, the target point Np may be a point positioned at the end of the sensing electrode surface 33S, it may be a point positioned at the end of the field of vision of the observer Ob, it may be a point corresponding to a point at the end of the range of contact for operation by the observer Ob within the operating surface 20S, or it may be a point at which the observation angle θ has a predetermined value within a range of between 15° and 60°.

The positional difference ΔL at the target point Np is then calculated. An example of the method for calculating the positional difference ΔL will be described below using a specific example. It should be noted that in order to simplify the calculation, a model which has been simplified by omitting layers of the touch panel 20 such as substrates other than the transparent dielectric substrate 33 will be used in the following description.

As shown in FIG. 12, the target point Np is at a position on the upper side in the vertical direction in relation to the position in front Fn. In addition, a facing distance dl which is the distance in a direction orthogonal to the sensing electrode surface 33S between the eye of the observer Ob and the sensing electrode surface 33S is 300 mm, and an observation height h1 which is the distance in a direction along the sensing electrode surface 33S between the eye of the observer Ob and the target point Np is 400 mm. Furthermore, the thickness t1 of the transparent dielectric substrate 33 is 0.1 mm, and the refractive index n1 of the transparent dielectric substrate 33 is 1.6.

The observation angle θ at the target point Np is calculated as 53.1° using an inverse trigonometric function based on the facing distance dl and the observation height h1. That is to say, the angle of refraction θ2 of light arriving at the observer Ob from the drive electrode wires 31DR positioned on the rear surface of the transparent dielectric substrate 33, through the target point Np, is 53.1°. The following equation is established by the angle of incidence θ1 of said light, the refractive index n1 of the transparent dielectric substrate 33, the angle of refraction θ2, and the refractive index n2 of air: $n1 \times \sin\theta1 = n2 \times \sin\theta2$, so if the refractive index n2 of air is 1.0, then this is calculated as $\sin\theta1 = 0.5$ and $\theta1 = 30°$. The positional difference ΔL is determined as 0.058 mm using a trigonometric function based on the angle of incidence θ1 and the thickness t1 of the transparent dielectric substrate 33. It should be noted that the abovementioned method for calculating the positional difference ΔL is an example, and the positional difference ΔL may equally be calculated using parameters other than the abovementioned parameters.

The enlargement ratio ER is set as a scale factor according to which a portion within the reference lattice 40KL positioned at the target point Np in a direction along the sensing electrode surface 33S is disposed at a position remote from the target point Np by the positional difference ΔL when the reference lattice 40KL has been enlarged by the enlargement ratio ER. For example, the enlargement ratio is expressed by the following equation: $ER\ (\%) = (h1 + \Delta L) \times 100 / h1$.

By setting the enlargement ratio ER in this way, it is possible to suppress an offset in the positions of the shape of the drive lattice 31DL which can be seen by the observer Ob and the reference lattice 40KL at the target point Np, in other words it is possible to suppress formation by the observed electrode wire pattern of a pattern which is distorted in relation to the ideal electrode wire pattern in the whole of the region where it is wished to suppress distortion of the electrode wire pattern.

According to the first mode of embodiment, the transparent dielectric substrate 33 is an example of the transparent dielectric layer. The front surface of the transparent dielectric substrate 33 is an example of the first surface, the rear surface of the transparent dielectric substrate 33 is an example of the second surface, the sensing lattice 33SL is an example of the first lattice, and the sensing electrode wires 33SR are an example of the first electrode wires. Furthermore, the drive lattice 31DL is an example of the second lattice, and the drive electrode wires 31DR are an example of the second electrode wires. It should be noted that electrode wire gaps for insulation may be present between the adjacent sensing electrodes 33SP, and one lattice pattern which also includes these gaps is the lattice pattern of the sensing lattice 33SL and of the reference lattice 40KL. Electrode wire gaps for insulation may likewise be present between the adjacent drive electrodes 31DP, one lattice pattern which also includes these gaps is the lattice pattern of the drive lattice 31DL. Furthermore, the electrode wires 33SR, 31DR forming the sensing lattice 33SL and the drive lattice 31DL may also include electrode wires which are insulated from the surrounding area.

As described above, it is possible to obtain the following advantages by virtue of this mode of embodiment.

(1) When each region of the conductive film 21 is seen from the front, the arrangement intervals of the drive electrode wires 31DR are greater than the arrangement intervals of the sensing electrode wires 33SR, and one drive electrode wire 31DR is positioned between two sensing electrode wires 33SR which are adjacent to each other. By virtue of this configuration, the shapes of the lattice lines of the drive lattice 31DL in regions where the observation angle θ is other than 0° appear offset in a direction approaching the position in front Fn in relation to the actual lattice lines of the drive lattice 31DL, so it is possible to suppress an offset from the ideal distance of the distance between the shapes of the sensing electrode wires 33SR and the shapes of the drive electrode wires 31DR. Consequently, it is possible to suppress formation by the observed electrode wire pattern of a pattern which is distorted in relation to the ideal electrode wire pattern, and therefore it is possible to suppress a reduction in the quality of an image observed on the display device 100.

(2) The drive lattice 31DL constitutes a pattern in which the reference lattice 40KL which is an imaginary lattice having the same lattice pattern as the sensing lattice 33SL has been enlarged, so the pattern of the drive lattice 31DL is easily formed.

(3) The reference lattice 40KL is positioned in such a way that lattice points of the reference lattice 40KL are positioned in a central portion within the cells of the sensing lattice 33SL and in such a way that a new lattice is formed by a combination of the sensing lattice 33SL and the reference lattice 40KL. The drive lattice 31DL is a pattern in which the reference lattice 40KL has been enlarged, centred on the reference point Rp which is an interior point of a region in which the reference lattice is positioned. By virtue of this configuration, as the distance away from the reference point Rp increases, so the distance between the lattice lines of the reference lattice 40KL and of the drive lattice 31DL tends to increase. Accordingly, by setting the reference point Rp in such a way as to be positioned in front of the observer Ob, the difference in the positions of the lattice lines of the reference lattice 40KL and of the drive lattice 31DL increases in regions where the positional difference ΔL is large, so it is possible to suppress an increase in the offset from the ideal distance of the distance between the shapes of the sensing electrode wires 33SR and the shapes of the drive electrode wires 31DR, caused by enlargement of the positional difference ΔL commensurate with the distance from the position in front Fn.

(4) The drive lattice 31DL is a pattern in which the reference lattice 40KL has been enlarged by a scale factor, which is the enlargement ratio ER, according to which a portion of the reference lattice 40KL positioned at the target point Np is disposed at a position remote by the positional difference ΔL from the target point Np as a result of the enlargement. By virtue of this configuration, it is possible to correctly suppress an offset of the positions of the shapes of the drive electrode wires 31DR which can be seen by the observer Ob at the target point Np from the positions of the lattice lines of the reference lattice 40KL, which is the ideal drive lattice 31DL. By setting the target point Np as the point furthest from the reference point Rp within the region in which distortion of the electrode wire pattern is to be suppressed, it is possible to suppress formation by the observed electrode wire pattern of a pattern which is distorted in relation to the ideal electrode wire pattern in the whole of that region.

(5) The scale factor of the enlargement of the drive lattice 31DL in relation to the reference lattice 40KL is constant in each direction centred on the reference point Rp. By virtue of this configuration, the pattern of the drive lattice 31DL is easily formed.

VARIANT EXAMPLES

The abovementioned mode of embodiment may be implemented with the following variations.

The enlargement ratio ER may be set by means of a method other than that in the mode of embodiment described above. That is to say, the drive lattice 31DL may equally be a pattern in which the reference lattice 40KL has been enlarged by a scale factor different from the scale factor set using the positional difference ΔL at the target point Np as a reference. The enlargement ratio ER should be a scale factor according to which, when any region included in the electrode wire pattern is viewed from the front, the drive lattice 31DL is formed in such a way that one drive electrode wire 31DR is positioned between two sensing electrode wires 33SR which are adjacent to each other in that region. When this drive lattice 31DL is used, the positions of the drive electrode wires 31DR in a direction along the front surface of the transparent dielectric substrate 33 are remote from the lattice lines of the reference lattice 40KL in a direction away from the reference point Rp in a range of less than one half of the distance between the lattice points of the reference lattice 40KL. Consequently, it is possible to reduce the magnitude of the offset in the positions of the shape of the drive lattice 31DL which can be seen by the observer Ob and the reference lattice 40KL, in comparison with a case in which a pattern aligned with the reference lattice 40KL is used as the drive lattice 31DL. In particular, even if the enlargement ratio ER is a scale factor different from a scale factor set using the positional difference ΔL at the target point Np as a reference, it is possible to suppress a situation in which the drive electrode wires 31DR appear to be over the sensing electrode wires 33SR, in comparison with a case in which a pattern aligned with the reference lattice 40KL is used as the drive lattice 31DL. It is therefore possible to suppress observation of moiré when the electrode wire pattern and the pixel pattern are superimposed.

In the mode of embodiment described above, the drive lattice 31DL is a pattern in which the reference lattice 40KL has been enlarged by a scale factor which is equal in the first electrode direction D1 and the second electrode direction D2. That is to say, the drive lattice 31DL is a pattern in which the reference lattice 40KL is enlarged while the aspect ratio is maintained, and the scale factor of enlargement of the drive lattice 31DL in relation to the reference lattice 40KL is constant in each direction centred on the reference point Rp.

Alternatively, the drive lattice 31DL may be a pattern in which the reference lattice 40KL has been enlarged by different scale factors according to direction. That is to say, the scale factor of enlargement of the drive lattice 31DL in relation to the reference lattice 40KL may differ in some directions from other directions centred on the reference point Rp. For example, the scale factor of enlargement of the reference lattice 40KL may be increased in a direction in which the positional difference ΔL increases, among directions centred on the reference point Rp, which are oblique directions above and below and to the left and right for the observer, in accordance with the shape and size of the operating surface 20S of the touch panel 20, and the position of the display device 100 in relation to the observer Ob, in other words the position at which the display device 100 is installed, among other things.

Furthermore, the scale factor of enlargement of the reference lattice 40KL may vary along one direction. For example, the scale factor of enlargement of the reference lattice 40KL may be increased as the distance away from the reference point Rp increases, and the scale factor of enlargement of the reference lattice 40KL may be increased in such a way as to widen radially from the reference point Rp by implementing this change in scale factor for all directions centred on the reference point Rp.

A portion of the drive lattice 31DL may be a pattern which is an enlargement of the reference lattice 40KL, and another portion of the drive lattice 31DL may be a pattern which is aligned with the reference lattice 40KL. For example, the area around the reference point Rp in the drive lattice 31DL may be a pattern aligned with the reference lattice 40KL, and the area around the target point Np may be a pattern which is an enlargement of the reference lattice 40KL. Furthermore, the drive lattice 31DL may be divided into a plurality of regions, and a region including the reference point Rp may be a pattern aligned with the reference lattice 40KL while a region around said region may be a pattern which is an enlargement of the reference lattice 40KL. For example, the drive lattice 31DL may be divided into nine regions by means of three equal divisions along each of the vertical direction and the lateral direction for the observer Ob, and a central region may be a pattern aligned with the reference lattice 40KL, and the eight regions surrounding the central region may be a pattern which is an enlargement of the reference lattice 40KL. Furthermore, the drive lattice 31DL may comprise a plurality of regions in which enlarged patterns of the reference lattice 40KL are located, with the enlargement ratio ER being different in each region.

In accordance with the abovementioned variant example, the drive lattice 31DL may include a plurality of regions having different arrangement intervals of the drive electrode wires 31DR. That is to say, the arrangement intervals of the drive electrode wires 31DR in the first intersection direction C1 may vary within the drive lattice 31DL, and the arrangement intervals of the drive electrode wires 31DR in the second intersection direction C2 may also vary within the drive lattice 31DL. Furthermore, for example, the arrangement intervals of the drive electrode wires 31DR in each of the first intersection direction C1 and the second intersection direction C2 may also widen as the distance away from the reference point Rp increases.

One drive electrode wire 31DR need not be positioned between two sensing electrode wires 33SR which are adjacent to each other in some regions of the drive lattice 31DL, when said regions are seen from the front. For example, when the enlargement ratio ER is set to be large in accordance with the thickness of the transparent dielectric substrate 33 and the size of the touch panel 20, etc., one drive electrode wire 31DR does not necessarily have to be positioned between all of the sets of two adjacent sensing electrode wires 33SR, when seen from the front, in regions at the ends of the drive lattice 31DL, and the sets of two adjacent sensing electrode wires 33SR may include sets in which a drive electrode wire 31DR is not positioned therebetween.

The drive lattice 31DL may be a pattern in which the reference lattice 40KL has been enlarged, centred on a point other than the reference point Rp. The display device 100 does not necessarily have to be used in such a way that the observer Ob views same from a determined position, depending on the application and installation position, etc. If a configuration is employed in which one drive electrode wire 31DR is positioned between two sensing electrode wires 33SR which are adjacent to each other in any region included in the electrode wire pattern when the drive lattice 31DL is a pattern which is an enlargement of the reference lattice 40KL and said regions are viewed from the front, then it is possible to reduce the magnitude of the offset in the positions of the shape of the drive lattice 31DL which can be seen by the observer Ob and the reference lattice 40KL in any observation position where the observer Ob might be located.

To summarize the abovementioned mode of embodiment and the abovementioned variant examples, in short, the drive lattice 31DL should include an enlargement region which satisfies the following configuration. That is to say, in the sensing lattice 33SL, a facing region is a region lying over the enlargement region with the transparent dielectric substrate 33 therebetween, and a placement direction is one arrangement direction of the sensing electrode wires 33SR in the facing region. Here, when the arrangement intervals of the drive electrode wires 31DR in the enlargement region in the placement direction is greater than the arrangement intervals of the sensing electrode wires 33SR in the facing region, and the enlargement region and the facing region are seen from a position in front of said regions, then one drive electrode wire 31DR is positioned between two sensing electrode wires 33SR which are adjacent to each other in the placement direction.

By virtue of this configuration, when the enlargement region and the facing region are viewed from any observation position where the observer Ob might be located, it is possible to reduce the magnitude of the offset in the positions of the shape of the drive lattice 31DL which can be seen by the observer Ob and the reference lattice 40KL. Accordingly, it is possible to suppress formation by the electrode wire pattern observed in the enlargement region and the facing region of a pattern which is distorted in relation to an ideal electrode wire pattern.

It should be noted that in the abovementioned mode of embodiment, the first intersection direction C1 and the second intersection direction C2 are each an example of the placement direction.

In the mode of embodiment described above, the sensing lattice 33SL and the drive lattice 31DL are each rectangular lattices having square unit cells. This is not necessarily the case, and the unit cells of each of the sensing lattice 33SL and the drive lattice 31DL may be rectangular or rhomboid. That is to say, the lattices should be quadrilateral lattices. Furthermore, the electrode wire pattern formed by superimposing the sensing lattice 33SL and the reference lattice 40KL, in other words the ideal electrode wire pattern, should also be formed by quadrilateral cells, and these unit cells are not limited to squares, and they may equally be rectangular or rhomboid.

The first electrode direction D1 which is the direction of extension of the sensing electrodes 33SP, and the second electrode direction D2 which is the direction of extension of the drive electrodes 31DP need not be orthogonal, but said directions should intersect. It should be noted that in a configuration in which the first electrode direction D1 and the second electrode direction D2 are orthogonal, an electrode wire pattern in which the sensing electrodes 33SP and the drive electrodes 31DP are superimposed is easily obtained, and furthermore, when the conductive film 21 is produced, it is a simple matter to align the positions of the sensing electrodes 33SP and the drive electrodes 31DP. Furthermore, the direction of extension of the sensing electrodes 33SP and the arrangement direction of the sensing electrodes 33SP need not be orthogonal to each other, but said directions should intersect. The direction of extension of the drive electrodes 31DP and the arrangement direction of the drive electrodes 31DP likewise need not be orthogonal to each other, but said directions should intersect.

Furthermore, the first intersection direction C1 and the second intersection direction C2 which are the directions of extension of the sensing electrode wires 33SR and the drive electrode wires 31DR may be directions aligned with the first electrode direction D1 and the second electrode direction D2. However, if the first intersection direction C1 and the second intersection direction C2 are different directions from the first electrode direction D1 and the second electrode direction D2, it is possible to suppress the occurrence of moiré caused by interference between the rectangular lattice pattern formed by the black matrix 15a, in other words the rectangular lattice pattern extending along the first electrode direction D1 and the second electrode direction D2, and the lattice pattern formed by the electrode wire pattern comprising the sensing lattice 33SL and the drive lattice 31DL.

Figure 13:
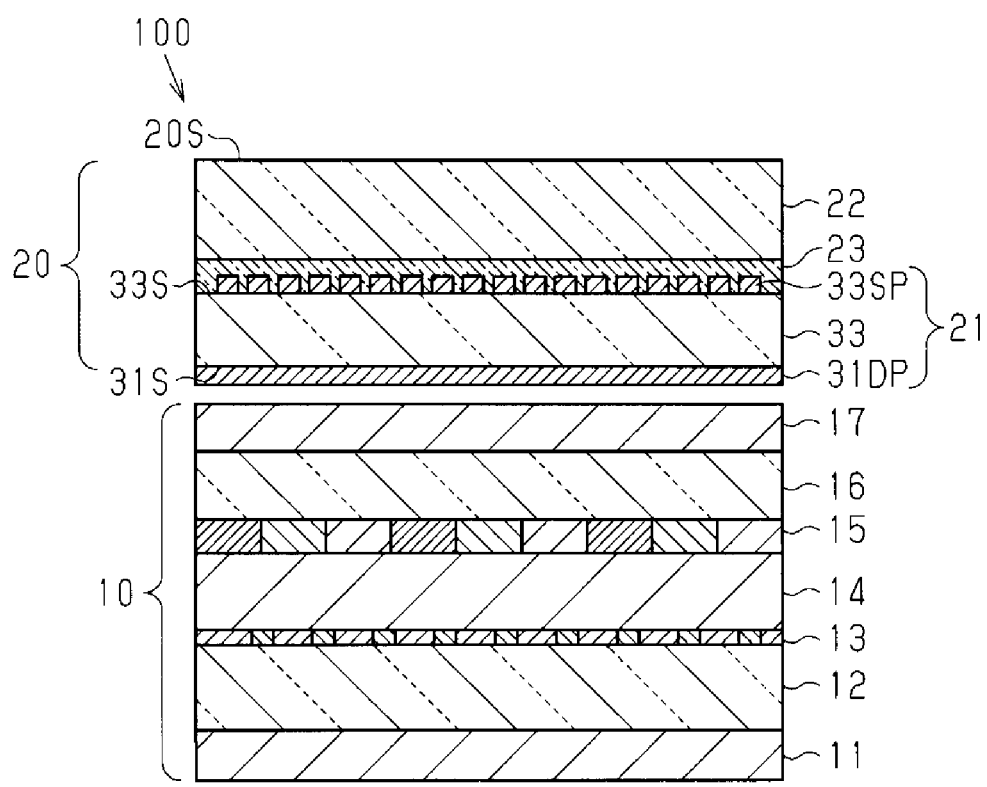
FIG. 13 is a view in cross section showing the cross-sectional structure of a display device according to a variant example.

As shown in FIG. 13, the transparent substrate 31 and the transparent adhesive layer 32 may be omitted from the conductive film 21 forming part of the touch panel 20. In such a configuration, the rear surface of the transparent dielectric substrate 33 facing the display panel 10 is set as the drive electrode surface 31S, and the drive electrodes 31DP are located on the drive electrode surface 31S. The front surface of the transparent dielectric substrate 33 on the opposite side to the rear surface is the sensing electrode surface 33S, and the sensing electrodes 33SP are located on the sensing electrode surface 33S. It should be noted that in such a configuration, the drive electrodes 31DP are formed, for example, by using etching to pattern one thin film formed on one surface of the transparent dielectric substrate 33, and the sensing electrodes 33SP are formed, for example, by using etching to pattern one thin film formed on the other surface of the transparent dielectric substrate 33.

It should be noted that it is simpler to form the electrode wires with a configuration in which the sensing electrodes 33SP and the drive electrodes 31DP are formed on different base materials, as in the modes of embodiment described above, than with a configuration in which said electrode wires are formed on both surfaces of one base material.

Figure 14:
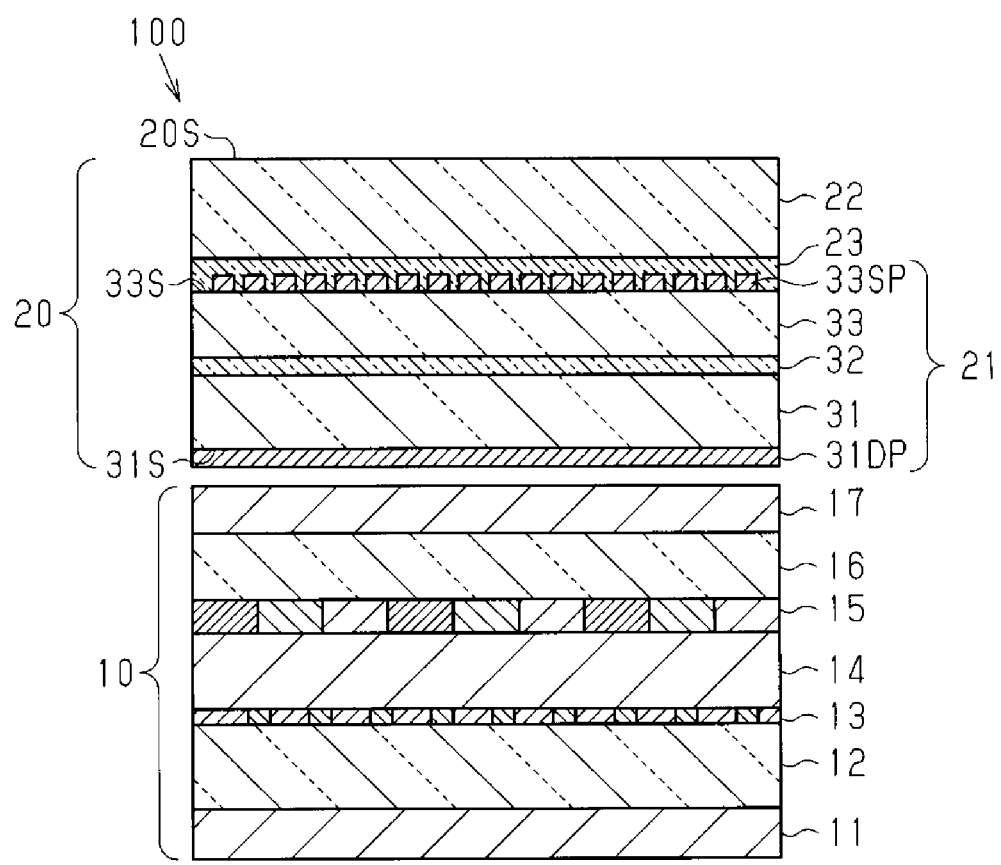
FIG. 14 is a view in cross section showing the cross-sectional structure of a display device according to a variant example.

As shown in FIG. 14, the structural elements of the touch panel 20 may be positioned in the following manner in succession from the structural element closest to the display panel 10: drive electrodes 31DP, transparent substrate 31, transparent adhesion layer 32, transparent dielectric substrate 33, sensing electrodes 33SP, transparent adhesion layer 23, cover layer 22.

In this configuration, for example, the drive electrodes 31DP are formed on one surface of the transparent substrate 31 constituting the drive electrode surface 31S, and the sensing electrodes 33SP are formed on one surface of the transparent dielectric substrate 33 constituting the sensing electrode surface 33S. The surface of the transparent substrate 31 on the opposite side to the drive electrode surface 31S, and the surface of the transparent dielectric substrate 33 on the opposite side to the sensing electrode surface 33S are bonded by means of the transparent adhesion layer 32. In this case, the transparent substrate 31, transparent adhesion layer 32 and transparent dielectric substrate 33 form the transparent dielectric layer, and the sensing electrode surface 33S of the transparent dielectric substrate 33 is an example of the first surface, while the drive electrode surface 31S of the transparent substrate 31 is an example of the second surface.

When the transparent dielectric layer is formed from a plurality of layers, in other words when a plurality of layers are present between the sensing electrodes 33SP and the drive electrodes 31DP, the positional difference ΔL at the target point Np is preferably calculated in accordance with the abovementioned modes of embodiment, and the enlargement ratio ER is preferably set in accordance with the positional difference ΔL.

That is to say, when the observer Ob views the target point Np from a position in front of the reference point Rp on a side facing the first surface of the transparent dielectric layer, the offset in a direction along the first surface between the position of the shape of a structure within the second surface observed at the position of the target point Np on the first surface, and the position of said structure on the second surface constitutes the positional difference ΔL. The drive lattice 31DL is preferably a scale factor according to which a portion of the reference lattice 40KL positioned at the target point Np is disposed at a position remote by the positional difference ΔL from the target point Np as a result of the enlargement.

The display panel 10 and the touch panel 20 need not be formed separately, and the touch panel 20 may be formed as a single piece with the display panel 10. In this configuration, for example, an in-cell structure may be adopted, in which the plurality of drive electrodes 31DP of the conductive film 21 are positioned on the TFT layer 13, while the plurality of sensing electrodes 33SP are positioned between the colour filter substrate 16 and the upper-side polarizing plate 17. Alternatively, an on-cell structure may also be adopted, in which the conductive film 21 is positioned between the colour filter substrate 16 and the upper-side polarizing plate 17. In this configuration, the layers between the drive electrodes 31DP and the sensing electrodes 33SP form the transparent dielectric layer.

KEY TO SYMBOLS

D1 . . . First electrode direction, D2 . . . Second electrode direction, Da . . . Observation direction, C1 . . . First intersection direction, C2 . . . Second intersection direction, Ob . . . Observer, ND . . . Capacity detector, Np . . . Target point, Rp . . . Reference point, Fn . . . Position in front, θ . . . Observation angle, ΔL . . . Positional difference, 10 . . . Display panel, 11 . . . Lower-side polarizing plate, 12 . . . Thin-film transistor substrate, 13 . . . TFT layer, 14 . . . Liquid crystal layer, 15 . . . Colour filter layer, 15P . . . Pixel, 16 . . . Colour filter substrate, 17 . . . Upper-side polarizing plate, 20 . . . Touch panel, 21 . . . Conductive film, 22 . . . Cover layer, 23 . . . Transparent adhesion layer, 31 . . . Transparent substrate, 31S . . . Drive electrode surface, 31DP . . . Drive electrode, 31DR . . . Drive electrode wire, 31DL . . . Drive lattice, 33 . . . Transparent dielectric substrate, 33S . . . Sensing electrode surface, 33SP . . . Sensing electrode, 33SR . . . Sensing electrode wire, 33SL . . . Sensing lattice, 34 . . . Selection circuit, 35 . . . Detection circuit, 36 . . . Control unit, 40KL . . . Reference lattice, 100 . . . Display device.

The invention claimed is:

1. A conductive film provided in a touch panel, the conductive film comprising:
   a transparent dielectric layer having a first surface, and a second surface on an opposite side to the first surface, the first surface being disposed on an operating surface side of a touch panel in relation to the second surface;
   a first lattice formed by a plurality of first electrode wires disposed on the first surface; and a second lattice formed by a plurality of second electrode wires disposed on the second surface, the second lattice including an enlargement region, the first lattice including a facing region lying over the enlargement region with the transparent dielectric layer therebetween, wherein when one of directions in which the plurality of first electrode wires are arranged in the facing region is a placement direction, and, in the placement direction, an interval at which the second electrode wires in the enlargement region are arranged is greater than an interval at which the first electrode wires in the facing region are arranged, and the enlargement region and the facing region are seen from a position in front of the enlargement region and the facing region, then one of the second electrode wires is positioned between two of the first electrode wires which are adjacent to each other in the placement direction, the second lattice having a lattice pattern in which a reference lattice is enlarged, the reference lattice constituting an imaginary lattice having a lattice pattern the same as a lattice pattern of the first lattice, wherein the reference lattice is positioned such that lattice points of the reference lattice are located in a central portion within cells of the first lattice, and a new lattice is formed by a combination of the first lattice and the reference lattice, the second lattice having a lattice pattern in which the reference lattice is enlarged, centered on an interior point of a region in which the reference lattice is positioned.

2. A conductive film according to claim 1, wherein:
the interior point is a reference point and a point remote from the reference point within the first surface is a target point, as seen from a direction facing the first surface;
when an observer views the target point from a position in front of the reference point on a side facing the first surface, an offset in a direction along the first surface, between a position of a shape of a structure within the second surface observed at a position of the target point on the first surface, and the position of said structure on the second surface, is a positional difference; and
the second lattice has a lattice pattern in which the reference lattice is enlarged by a scale factor according to which a portion of the reference lattice positioned at the target point is disposed at a position remote by the positional difference from the target point as a result of the scale factor of enlargement.

3. A conductive film according to claim 1, wherein the scale factor of enlargement of the second lattice in relation to the reference lattice is constant in each direction centered on the interior point.

4. A conductive film according to claim 1, wherein the scale factor of enlargement of the second lattice in relation to the reference lattice differs in some directions from other directions centered on the interior point.

5. A conductive film according to claim 1, wherein the scale factor of enlargement of the second lattice in relation to the reference lattice increases away from the interior point.

6. A conductive film according to claim 1, wherein the second lattice includes a plurality of regions in which arrangement intervals of the second electrode wires are different, and at least one of of the plurality of regions is the enlargement region.

7. A touch panel comprising:
a conductive film comprising a transparent dielectric layer having a first surface, and a second surface on an opposite side to the first surface, the first surface being disposed on an operating surface side of a touch panel in relation to the second surface, the conductive film further comprising a first lattice formed by a plurality of first electrode wires disposed on the first surface and a second lattice formed by a plurality of second electrode wires disposed on the second surface, the second lattice including an enlargement region, the first lattice including a facing region lying over the enlargement region with the transparent dielectric layer therebetween, wherein when one of directions in which the plurality of first electrode wires are arranged in the facing region is a placement direction, and, in the placement direction, an interval at which the second electrode wires in the enlargement region are arranged is greater than an interval at which the first electrode wires in the facing region are arranged, and the enlargement region and the facing region are seen from a position in front of the enlargement region and the facing region, then one of the second electrode wires is positioned between two of the first electrode wires which are adjacent to each other in the placement direction, the second lattice having a lattice pattern in which a reference lattice is enlarged, the reference lattice constituting an imaginary lattice having a lattice pattern the same as a lattice pattern of the first lattice, wherein the reference lattice is positioned such that lattice points of the reference lattice are located in a central portion within cells of the first lattice, and a new lattice is formed by a combination of the first lattice and the reference lattice, the second lattice having a lattice pattern in which the reference lattice is enlarged, centered on an interior point of a region in which the reference lattice is positioned;
a cover layer for covering the conductive film; and
peripheral circuitry for measuring electrostatic capacity between electrodes formed by the first electrode wires and electrodes formed by the second electrode wires.

8. A display device comprising:
a display panel having a plurality of pixels arranged in a lattice shape to display information;
a touch panel which transmits the information displayed by the display panel, the touch panel comprising a conductive film comprising a transparent dielectric layer having a first surface, and a second surface on an opposite side to the first surface, the first surface being disposed on an operating surface side of a touch panel in relation to the second surface, the conductive film further comprising a first lattice formed by a plurality of first electrode wires disposed on the first surface and a second lattice formed by a plurality of second electrode wires disposed on the second surface, the second lattice including an enlargement region, the first lattice including a facing region lying over the enlargement region with the transparent dielectric layer therebetween, wherein when one of directions in which the plurality of first electrode wires are arranged in the facing region is a placement direction, and, in the placement direction, an interval at which the second electrode wires in the enlargement region are arranged is greater than an interval at which the first electrode wires in the facing region are arranged, and the enlargement region and the facing region are seen from a position in front of the enlargement region and the facing region, then one of the second electrode wires is positioned between two of the first electrode wires which are adjacent to each other in the placement direction, the second lattice having a lattice pattern in which a reference lattice is enlarged, the reference lattice constituting an imaginary lattice having a lattice pattern the same as a lattice pattern of the first lattice, wherein the reference lattice is positioned such that lattice points of the reference lattice are located in a central portion within cells of the first lattice, and a new lattice is formed by a combination of the first lattice and the reference lattice, the second lattice having a lattice pattern in which the reference lattice is enlarged, centered on an interior point of a region in which the reference lattice is positioned, the touch panel further comprising a cover layer for covering the conductive film and peripheral circuitry for measuring electrostatic capacity between electrodes formed by the first electrode wires and electrodes formed by the second electrode wires; and a control unit for controlling driving of the touch panel.

\* \* \* \* \*